(12) United States Patent  
Oguma

(10) Patent No.: US 6,384,868 B1
(45) Date of Patent: May 7, 2002

(54) MULTI-SCREEN DISPLAY APPARATUS AND VIDEO SWITCHING PROCESSING APPARATUS

(75) Inventor: Tadashi Oguma, Saitama-ken (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 0 days.

(21) Appl. No.: 09/112,283

(22) Filed: Jul. 9, 1998

(30) Foreign Application Priority Data

Jul. 9, 1997 (JP) .............................................. 9-184073
Sep. 26, 1997 (JP) .............................................. 9-262498

(51) Int. Cl.[7] .......................... G04N 5/45; G04N 5/445; G04N 5/268
(52) U.S. Cl. ...................... 348/564; 348/565; 348/566; 348/567; 348/568; 348/705
(58) Field of Search ................................ 348/564, 565, 348/566, 567, 568, 705

(56) References Cited

U.S. PATENT DOCUMENTS

| | | | | |
|---|---|---|---|---|
| 5,557,342 A | * | 9/1996 | Eto et al. ..................... | 348/706 |
| 5,680,177 A | * | 10/1997 | Abe ............................. | 348/564 |
| 5,754,253 A | * | 5/1998 | Lee ............................. | 348/565 |
| 5,929,933 A | * | 7/1999 | Takeuchi ...................... | 348/581 |
| 5,969,767 A | * | 10/1999 | Ishikawa et al. ............ | 348/564 |
| 5,969,769 A | * | 10/1999 | Hamadate .................... | 348/568 |
| 5,986,633 A | * | 11/1999 | Takeuchi ...................... | 345/115 |
| 6,069,662 A | * | 5/2000 | Horiuchi et al. ............ | 348/446 |
| 6,147,717 A | * | 11/2000 | Jun ............................. | 348/588 |

* cited by examiner

Primary Examiner—Andrew Faile
Assistant Examiner—Paulos Natnael
(74) Attorney, Agent, or Firm—Pillsbury Winthrop LLP

(57) ABSTRACT

When a sub-image (A) and a sub-image (B) are displayed as semi-moving pictures on a multi-screen, the fields of the input sub-images (A) and (B) are determined. By setting the field determination result as one condition for a write to the memory 114, the sub-images (A) and (B) can be stably written to the memory 114 in either odd fields (ODD) or even fields (EVEN), and can be read and displayed on the screen without flickering characters due to line flicker. Furthermore, when video signals are switched for a channel switch or an input switch, the operation remote controller 501 can issue a switch instruction so that a write to the video memory 509 is stopped according to the generated switch signal, and the image is displayed as a still image. In response to a new input video signal, the number of write increase lines or picture elements for a write to the video memory 509 is set to n. The writing operation is performed m times (m is a natural number) for every other field. According to the operation of n×m, the number of write increase lines or picture elements is incremented, and the updated image at the image switch can be gradually switched from one end of the screen or in combination of vertical and horizontal directions.

13 Claims, 17 Drawing Sheets

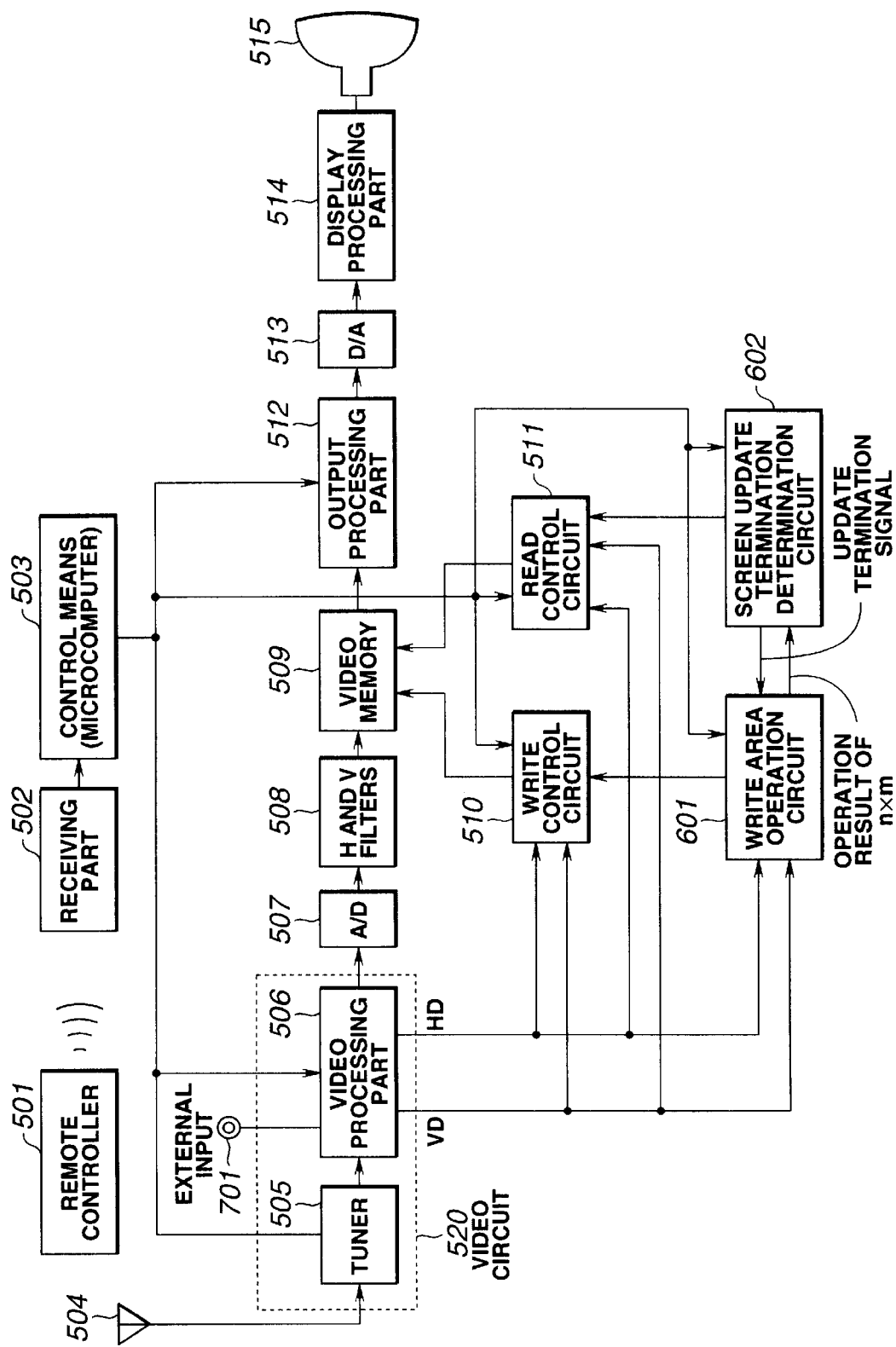

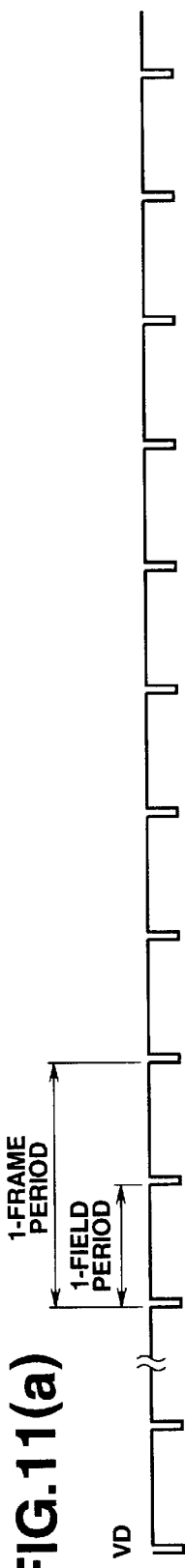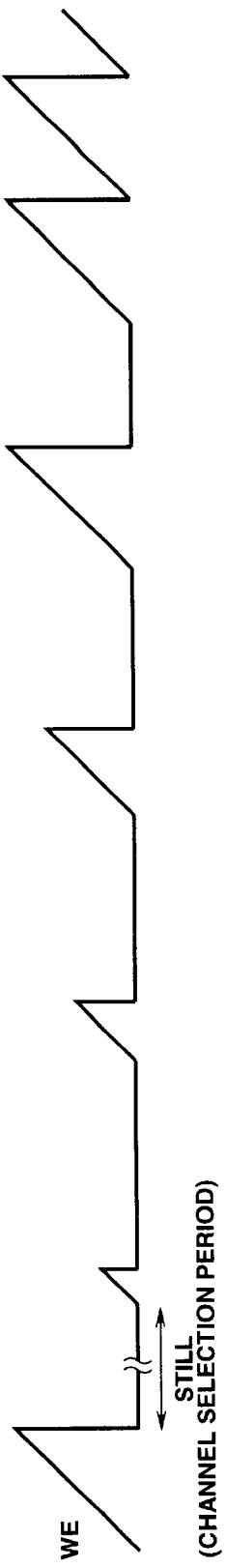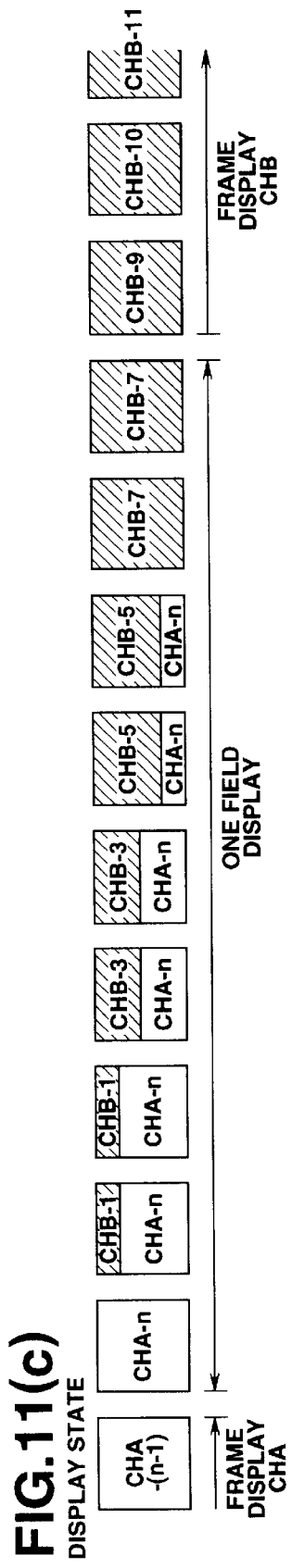

MAIN SCREEN | SUB-SCREEN

CH SWITCH (3CH → 4CH)

ONE FIELD STILL

MOVING PICTURE

ONE FIELD
VIDEO AFTER CH SWITCH OVERLAYING FROM TOP OF SCREEN

ONE FIELD

FRAME DISPLAY
AFTER VIDEO HAS BEEN COMPLETELY REWRITTEN, ONE FIELD DISPLAY IS CHANGED INTO FRAME DISPLAY

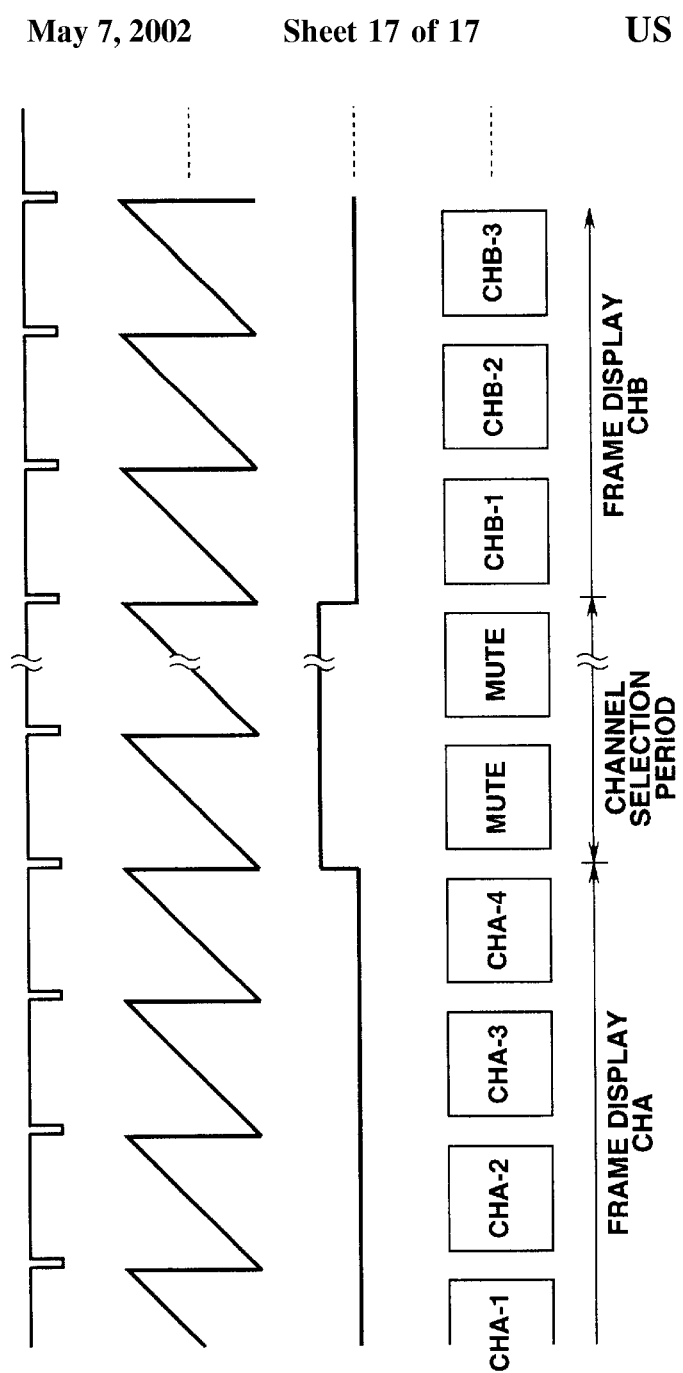

MULTI-SCREEN DISPLAY APPARATUS AND VIDEO SWITCHING PROCESSING APPARATUS

BACKGROUND OF THE INVENTION

1. Field of the Invention

The present invention relates to a multi-screen display apparatus and a video switching processing apparatus, and more specifically to a multi-screen display apparatus and a video switching processing apparatus which improves display quality by realizing a screen display without flickering when a sub-screen is displayed and by smoothly switching screens when an image displayed on the screen is switched to another image when, for example, a channel is switched in a video device such as a television receiver which includes a video memory and processes a digital signal by controlling write and read to the memory.

2. Description of the Related Art

Television receivers having a function of displaying two, three, or more screens in addition to a normal (main) screen have been conventionally marketed. Furthermore, television receivers having wide aspect (wide screen) color picture tubes (hereinafter referred to as CPT) such as an HDTV (high definition television) and an EDTV have become popular. Based on the above described background, multi-screen display models (for displaying a plurality of sub-screens on a display device) specific to wide aspect CPT television receivers (referred to as wide television receivers) have been developed.

A sub-screen processing method in the conventional multi-screen display apparatus is described below by referring to FIGS. 15 and 16. FIG. 15 shows an example of displaying multiple screens. FIG. 16 is a block diagram showing a configuration of the conventional multi-screen display apparatus. As shown in FIG. 15, the method of displaying a main screen using a video signal (main image) and sub-screens A and B adjacent to the main screen using two video signals (sub-images A and B) different from the signal for the main screen is described below as an example of the conventional technology. In this case, a compressing process is horizontally performed on the video signal of the main screen to normally display a moving picture. The video signals of the sub-screens A and B are alternately written to and read from two areas A and B of the video memory (hereinafter referred to simply as memory) at predetermined intervals (that is, one field for several fields in the fields forming video signals of the sub-screens A and B), and displayed as a multi-screen semi-moving picture. When the sub-images A and B are written to the memory, the vertical amplification of each image is ½. Therefore, the number of horizontal lines of the field images A and B written to the memory is reduced to ½.

In FIG. 16, a horizontal synchronous signal (hereinafter referred to as a sub-HD (A)), a vertical synchronous signal (hereinafter referred to as a sub-VD (A)), and a video signal (hereinafter referred to as a sub-image (A)) of the sub-screen A are respectively input to input terminals 100, 101, and 102 in a system A of a selector 119. A horizontal synchronous signal (hereinafter referred to as a sub-HD (B)), a vertical synchronous signal (hereinafter referred to as a sub-VD (B)), and a video signal (hereinafter referred to as a sub-image (B)) of the sub-screen B are respectively input to input terminals 106, 107, and 108 in a system B.

A selector 119 is controlled by an A/B selection signal of a microcomputer 130, and an input signal of the above described A or B system is selected, and a horizontal synchronous signal HD, a vertical synchronous signal VD, and a video signal of the sub-screen converted into digital data by an A/D converter 103 are provided to a synchronous video processing circuit 104.

In the synchronous video processing circuit 104, a clock is obtained by providing a control signal to a PPL circuit 105, and a system clock can be generated by dividing the obtained clock as necessary. According to the system clock, a horizontal reference pulse HD' and a vertical reference pulse VD' can be generated from each of the input signals in the synchronous video processing circuit 104. Simultaneously, it is determined whether the video field is an odd field (ODD) or an even field (EVEN), and a field flag (for example, a high-level signal for an ODD) is generated. Then, an operating process such as video compression is performed on a sub-image, and a compressed video signal of the system A or B and each control signal (a system clock, a horizontal reference pulse, a vertical reference pulse, a field flag) are provided to a memory write control circuit 113.

The memory write control circuit 113 determines a field to be written to according to the VD' signal and the field flag. Furthermore, a write control signal (hereinafter referred to as a WE) is generated as a write enabling signal during the period of the determined field, and is provided to a memory 114. Two sets of video signals of the sub-screen A or B divided into a luminance signal and a chrominance signal according to the WE are written into the memory 114.

A horizontal synchronous signal (hereinafter referred to as a main HD), a vertical synchronous signal (hereinafter referred to as a main-VD), and a video signal (hereinafter referred to as a main image) of the main-screen are respectively input to terminals 120, 121, and 122. The HD and VD of the main screen are provided to a memory read control circuit 115 and a main video processing circuit 124, and the main video signal is converted into digital data by an A/D converter 123 and provided to the main video processing circuit 124.

The main video processing circuit 124 performs a process such as a compressing process on the main video signal. The main video signal is converted into an analog signal by a D/A converter 125, and provided to a selector 117.

On the other hand, using the above described two sets of video signals of the sub-screen written to the memory 114, the sub-screens A and B are read according to the control signal output from the memory read control circuit 115 to the memory 114 based on the HD and VD for the main screen provided to the memory read control circuit 115 and input from the input terminals 120 and 121.

After the memory read control circuit 115 performs an output process such as a phase adjustment of a luminance signal and a chrominance signal on the video signals of the read sub-screens, a D/A converter 116 converts the video signals into analog data and provided to the selector 117.

Using the main/sub-selection signal output from the memory read control circuit 115 for realizing a multi-screen display, the selector 117 selects the main video signal and the synthesizing signals of the sub-screens A and B alternately, and outputs the synthesized main/sub-video signal to a terminal 126. The main video signal is normally a moving picture signal, and the signals of the sub-screens A and B are semi-moving signals to be rewritten according to the switch period of the A/B selection signal of the selector 119.

As described above, the A/B selection signal for realizing the semi-moving picture of the sub-screens A and B are provided to the selector 119 from the microcomputer 130. The microcomputer 130 switches the A/B selection signal regardless of the write state to the memory after a predetermined time. The shorter the period of the A/B selection signal is, the closer to moving pictures the sub-screens A and B become. However, it requires about 8 fields or more because of the time taken to stabilize the video switching in other circuits, and the time required to control the write to the memory, thereby obtaining a stroboscopic image.

As described above, in the conventional multi-screen semi-moving picture display, the sub-images (A) and (B) provided as input data are switched from each other by the microcomputer providing the A/B selection signal having a predetermined period to the selector 119 regardless of the state of the write to the memory. To display a sub-screen as a moving picture closer to the main screen, it is necessary to reduce the write field interval of the sub-image written to the memory 114. However, since it is impossible to stably discriminate a field for a short time, the field to be written to the memory cannot be fixed as an ODD or an EVEN, thereby generating the problem of flickering characters due to line flicker.

Furthermore, for the sub-images (A) and (B) provided as input, the vertical synchronous phase relationship (late or fast) between the sub-VD (A) which is a vertical synchronous signal of the sub-image (A) and the sub-VD (B) which is a vertical synchronous signal of the sub-image (B) cannot be constantly monitored. Therefore, the field interval of the write to the memory is determined under the worst phase conditions, and the write field interval cannot be properly changed based on the relationship of the vertical synchronous phases between the two systems.

Furthermore, since the conventional system cannot freely set the write position to the memory of the sub-screens A and B, there has been the problem that sub-screens can only be displayed as the screens divided into upper and lower screens in the multi-screen display.

On the other hand, the video apparatus such as a television receiver can switch input such as a channel switching, a TV/video switching (switching between a video signal obtained by detecting a television broadcast signal and an external input video signal from the VTR, etc.).

To avoid a flickering screen when a screen is switched to another screen in such a channel switching process and an input switching process, a so-called screen mute is adopted by setting the screen at a black level for a predetermined period when images are switched.

The video switching process is described below by referring to a television receiver for processing a signal by providing the above described video memory and controlling write to and read from the memory.

FIG. 17 is a block diagram showing the video switching processing apparatus in the conventional television receiver. Described below is a receiver capable of realizing special functions such as a special effect of a field image, a frame image, a moving picture, a still image, a stroboscopic image, etc. and special functions of a multi-screen, a picture-in-picture, etc. by converting an NTSC composite video signal in a base band into a digital signal, and then inputting the digital signal to the video memory. These functions can be performed by digitizing field or frame video information stored in the video memory. When a flame image is displayed, for example, the odd and even field images are written respectively to the two areas A and B of the video memory. When they are read, the odd field is first read from the area A and displayed, and then the even field is read from the area B and displayed, thereby obtaining a frame display screen after synthesizing two field images through interlace scanning display.

The channel of a television broadcast signal from an antenna 104 is selected by a tuner 505 according to the channel information from a control means 503, and transmitted to a video processing part 506. The control means 503 comprises, for example, a microcomputer.

The video processing part 506 detects a video signal contained in the broadcast signal, separates a synchronous signal (vertical synchronous signal VD and horizontal synchronous signal HD), and luminance and chrominance signals from a video signal, and provides the video signal (luminanc signale and chrominance signal) to an A/D converting circuit 507. The video processing part 506 includes an input switching means for switching a video detecting signal obtained by detecting a broadcast signal and a video signal from an external input terminal 701. The tuner 505 and the video processing part 506 form a video circuit 520 capable of taking in, switching, and outputting an input signal. The A/D converting circuit 507 converts a video signal into a digital video signal. On the other hand, the horizontal synchronous signal (HD) and the vertical synchronous signal (VD) from the video processing part 506 are provided to a write control circuit 510.

A video signal converted into digital data is provided to a video memory 509 through horizontal and vertical (H and V) filters 508. The H and V filters 508 have the function of compressing a digital video signal horizontally and vertically. When the signal is not compressed, it passes through the filters. The video memory 509 is, for example, memory having the capacity for 1 frame.

The write control circuit 510 generates a write control signal such as a memory write enable signal (WE) according to the information from the control means 103, and writes the video signal to the video memory 509 using the generated signal. The written video signal is read from a video memory 509 according to a read control signal such as a read enable signal (RE) generated by a read control circuit 511, and provided to an output processing part 512. Under the control of the write control circuit 510 and the read control circuit 511, the video memory 509 reads every field of 1-frame video signal written field by field, and outputs the signal as a 1-frame video signal.

The output processing part 512 adds a constant direct current (DC) level to the area other than the video period, and adjusts the phase of the luminance signal and the chrominance signal. However, in the video switching period when a channel is switched or an input is switched, for example, a black level mute state (MUTE) is made by exchanging the video signal for the DC level.

Then, a D/A converting circuit 513 converts the signal into analog data, and a display processing part 514 performs a matrix transformation on a color signal, and displays it on a CRT display 115, which is display means.

As described above, when a video switching process is performed, for example, when a channel is switched, a video signal interfered during the selection of a channel is prevented from being displayed by making a mute state such as a black level.

FIGS. 18(*a*) through (*d*) are timing charts of the video switching process of FIG. 17. Described below is the operation performed when a channel switch signal is provided to the control means 503 through a receiving part 502 by a remote controller 501, which is an operating means, when a channel A is being received so that, in the television receiver, a channel B can be selected.

FIG. 18(a) shows a vertical synchronous signal (VD) provided from the video processing part 506 to the write control circuit 510. FIG. 18(b) shows a memory write enable signal (WE) to be provided from the write control circuit 510 to the video memory 509. FIG. 18(c) shows a video mute signal (MUTE) provided from the control means 503 to the output processing part 512. FIG. 18(d) shows the display state of the video signal in the CRT display 515. In FIG. 18(d), CHA indicates the channel A, and CHA-1, CHA-2, CHA-3, . . . indicate field images 1, 2, 3, . . . frame-displayed by writing each field in the channel A using the WE and then reading each field. The MUTE indicates a mute image at the black level displayed according to the mute signal corresponding to the channel-selection period shown in FIG. 18(c). Furthermore, CHB-1, CHB-2, CHB-3, . . . indicate field images 1, 2, 3, . . . of the channel B frame-displayed after the mute period.

In the operations shown in FIGS. 18(a) through 18(d), the CRT display 515 suddenly enters the mute state such as the black level from the frame display state of the channel A. The mute state is maintained until the synchronization after the channel selection becomes stable, and the frame display of the channel B suddenly starts.

Thus, when the input image is switched, the screen mute period is set, and an disturbed image displayed by the synchronization error occurring immediately after the input image is switched can be avoided.

As described above, when the user switches a channel or an input of TV/VTR, etc., through the remote controller 501, a screen mute period such as a black level has been required when an image is switched. Therefore, when a video signal is switched, a screen is updated through a mute screen. As a result, a video signal is switched to update a screen through a mute screen, thereby updating the screen without smoothness and generating an unnatural screen because the entire screen is changed at a time.

SUMMARY OF THE INVENTION

The first object of the present invention is to provide a multi-screen display apparatus capable of suppressing the generation of flickering characters due to line flicker when a sub-screen is displayed and improving the display quality of the sub-screen.

The second object of the present invention is to provide a multi-screen display apparatus capable of freely setting the write position of the sub-screen to the video memory.

The third object of the present invention is to provide a multi-screen display apparatus capable of displaying a picture close to a moving picture on a sub-screen.

The fourth object of the present invention is to provide a video switching processing apparatus capable of smoothly switching screens without unnatural expression in switching screens to a new image when a channel is switched and an input is switched.

To attain the above described objects, a multi-screen display apparatus according to the first invention comprises:

first synchronous video processing means for synchronously video processing a video signal of the first input system;

second synchronous video processing means for synchronously video processing a video signal of the second input system;

first field determining means for determining whether the video signal output from the first synchronous video processing means is an odd field or an even field;

second field determining means for determining whether the video signal output from the second synchronous video processing means is an odd field or an even field;

selection switching means for selecting one of two sets of signals synchronously video-processed by the first and second synchronous video processing means;

storing means for storing the first or second video signal synchronously video-processed by the first or second synchronous video processing means and selected by the selection switching means;

write means for writing a video signal from the selection switching means to the storing means only when the first or second video signal output from the selection switching means is either an odd field or an even field based on the determination result from the first or second field determining means; and read means for reading a video signal written to the storing means according to a predetermined synchronous signal.

According to the first invention, in the semi-moving picture display circuit of a multi-screen display containing the sub-images (A) and (B), the first and second field determining means for individually determining fields according to each vertical synchronous signal are provided, the field determination result is selected when the selection switching means selects the sub-images (A) and (B), and the selected field determination result is defined as a write condition to the storing means, thereby stably writing a sub-image (A) and a sub-image (B) in either odd fields (ODD) or even fields (EVEN) and removing flickering characters due to line flicker.

A multi-screen display apparatus according to the second invention comprises:

first synchronous video processing means for synchronously video processing a video signal of the first input system;

second synchronous video processing means for synchronously video processing a video signal of the second input system;

first field determining means for determining whether the video signal output from the first synchronous video processing means is an odd field or an even field;

second field determining means for determining whether the video signal output from the second synchronous video processing means is an odd field or an even field;

selection switching means for selecting one of two sets of signals synchronously video-processed by the first and second synchronous video processing means;

storing means for storing the first or second video signal synchronously video-processed by the first or second synchronous video processing means and selected by the selection switching means;

write means for writing a video signal from the selection switching means to the storing means only when the first or second video signal output from the selection switching means is either an odd field or an even field based on the determination result from the first or second field determining means;

write interval variable means for controlling the write means such that the first and second video signals can be repectively written to the storing means at 2N-field intervals (N indicates a natural number) depending on the vertical synchronization phase relationship between the first and second video signals; and read means for reading a video signal written to the storing means according to a predetermined synchronous signal.

According to the second invention, as in the first invention, the sub-images (A) and (B) are written to the storing means using one of odd fields (ODD) or even fields (EVEN) to remove flickering characters, etc. due to line flicker. On the other hand, depending on the vertical synchronization phase relationship between the sub-images (A) and (B), the selection switching means properly varies the A/B selection switching timing in the selection switching means, thereby displaying images as if they were moving pictures by reducing the field update intervals on the sub-screens(semi-moving images) (A) and (B).

The write interval variable means includes means for generating a write control signal (WE) based on the field determination result, and means for switching the A/B selection signal after detecting the end of the WE.

A multi-screen display apparatus according to the third invention comprises:

first synchronous video processing means for synchronously video processing a video signal of the first input system;

second synchronous video processing means for synchronously video processing a video signal of the second input system;

first field determining means for determining whether the video signal output from the first synchronous video processing means is an odd field or an even field;

second field determining means for determining whether the video signal output from the second synchronous video processing means is an odd field or an even field;

selection switching means for selecting one of two sets of signals synchronously video-processed by the first and second synchronous video processing means;

storing means for storing the first or second video signal synchronously video-processed by the first or second synchronous video processing means and selected by the selection switching means;

first write means for writing a video signal from the selection switching means to the storing means only when the first or second video signal output from the selection switching means is either an odd field or an even field based on the determination result from the first or second field determining means;

second write means for independently generating a skip signal for optionally setting an address in the storing means and writing the first or second video signal to the storing means when writing the first or second video signal to the storing means;

write interval variable means for controlling the first and second write means such that the first and second video signals can be written to a predetermined position in the storing means based on the value of the skip signal, and that the first and second video signals can be respectively written to the storing means at 2N field intervals (N indicates a natural number) depending on the vertical synchronization phase relationship between the first and second video signals; and read means for reading the video signal written to the storing means according to a predetermined synchronous signal.

According to the third invention, as in the second invention, the sub-images (A) and (B) are stably written to the storing means using one of odd fields (ODD) or even fields (EVEN) to remove flickering characters, etc. due to line flicker. On the other hand, depending on the vertical synchronization phase relationship between the sub-images (A) and (B), the selection switching means properly varies the A/B selection switching timing in the selection switching means, thereby displaying images as if they were moving pictures by reducing the field update intervals on the sub-screens(semi-moving images) (A) and (B). Furthermore, when the sub-images (A) and (B) are written to the storing means, the display positions of the sub-images (A) and (B) can be individually adjusted by writing them to the storing means after optionally setting the address in the storing means using, for example, a signal called an input enable signal which is one of memory control signals. In this case, if the phase relationship of the vertical synchronous signals of the sub-images (A) and (B), and the amount of skip by the input enable signal satisfy a predetermined condition, the update field interval of the sub-images (A) and (B) can be set to 2 fields.

The feature of a multi-screen display apparatus according to the fourth invention is that, in the multi-screen display apparatus according to the second or third invention, the write interval variable means controls the write means such that the first and second video signals can be written to the storing means at 2- or 4-field intervals based on the vertical synchronous phase relationship between the first and second video signals.

According to the fourth invention, the field update interval of the sub-images (A) and (B) is set, depending to the vertical synchronous phase relationship, automatically to 2 fields when the vertical synchronous phase relationship of the sub-images (A) and (B) is in a specified state, and automatically to 4 fields when the vertical synchronous phase relationship is except in said specified state, thereby reducing the write field interval of the sub-images (A) and (B) and displaying the images as if they were moving pictures.

A multi-screen display apparatus according to the fifth invention comprises:

M (M indicates a natural number) synchronous processing means for processing synchronous signals of video signals of M input systems;

M field determining means for determining whether video signals of M input systems are odd fields or even fields;

selection switching means for sequentially switching and outputting M sets of signals in pairs of various signals synchronously processed by the M synchronous processing means and corresponding video signals;

video processing means for video-processing the video signal in a pair of the signals sequentially output from the selection switching means;

storing means for storing the video signal output from the video processing means;

write means for writing a video signal from the video processing means to the storing means only when the M video signals sequentially output from the selection switching means are either odd or even fields based on the determination result from the M field determining means; and read means for reading a video signal written to the storing means according to a predetermined synchronous signal.

According to the fifth invention, a multi-screen display apparatus having M input systems has M synchronous processing circuits. Each of M input signals is written to the storing means using either odd fields (ODD) or even fields (EVEN). Depending on the vertical synchronous phase relationship between input signals, a write can be made to the storing means in the next field. Thus, the write update time can be reduced, and flickering characters due to line flicker can be avoided. According to the present invention, one system of the video processing means is provided at the latter stage of the selection switching means of an input video signals.

A multi-screen display apparatus according to the sixth invention comprises:

first selection switching means for selection-switching synchronous signals of video signals from M (M is a natural number) input systems, and for sequentially outputting the signals;

synchronous processing means for synchronously processing the M signals sequentially output from the first selection switching means.

second selection switching means for selection-switching video signals from M input systems, and for sequentially outputting the signals;

video processing means for video-processing the M signals sequentially output from the second selection switching means.

field determining means for determining whether a video signal output from the video processing means is an odd field or an even field;

storing means for storing a video signal video-processed by the video processing means;

write means for writing the video signal to the storing means only when the M video signals sequentially output from the video processing means are either odd fields or even fields based on the determination result of the field determining means; and read means for reading a video signal written to the storing means according to a predetermined synchronous signal.

According to the sixth invention, in the multi-screen display apparatus having M input systems, a circuit can be reduced and the write of video signals to the storing means can be fixed only to odd fields (ODD) or even fields (EVEN) by first selecting an input video signal and an input synchronous signal by the first and second selection switching means, and then performing a video process and a synchronous process, thereby eliminating flickering characters due to line flicker.

The seventh invention is a video switching processing apparatus for switch-processing video signals using video memory, comprising:

video circuit for switching and outputting an input video signal; A/D converting circuit for A/D converting the video signal from the video circuit;

operating means for instructing a switch of a video signal to be provided from the video circuit to the A/D converting circuit;

video memory for storing a digital video signal from the A/D converting circuit;

write control circuit for generating a write control signal and writing the digital video signal to the video memory;

control means for controlling switching a video signal in the video circuit by generating a video switch signal according to an instruction to switch the video signal from the operating means, and for controlling stopping a write to the video memory for a predetermined period after a video switch instruction by controlling the write control circuit according to the video switch signal;

write area operation (or arithmetic) circuit for starting a write to every other field in the video memory by controlling the write control circuit after stopping the write in the predetermined period by the control means, determining the number n of lines or the number n (n is a fixed value) of picture elements increased in one writing operation, and setting a write area by performing an operation of n×m, that is, multiplying n by the number m of writing operations (m is a natural number) to set a write area;

screen update termination determining circuit for comparing the operation result of n×m from the write area operation circuit with a predetermined end-of-write position, generating a screen update termination signal for changing the write to the video memory into a frame write (a write to every field) when the operation result n×m reaches the end-of-write position and thereby the video switching process is completed, and providing the signal for the write area operation circuit;

read control circuit for generating a read control signal and reading a digital video signal from the video memory;

means for setting a read of the video memory to a one-field read, in a term from the stop of a write to the video memory by the control means to the completion of the video switching process by the screen update termination determination circuit, and for changing the one-field read into a frame read (a read of every field) after the term;

D/A converting circuit for D/A converting the output from the video memory; and display means for displaying a display signal according to an analog video signal from the D/A converting circuit.

According to the seventh invention, a video signal before update is set still when images are switched, for example, when a channel is selected. After the synchronization becomes stable after the channel selection, n×m lines (n is a fixed value and m is a natural number) are written for every other field into the video memory. As a result, a video signal after the switching can be updated while, for example, gradually moving downward from the top of the screen. Thus, the screen can be updated while images are smoothly switched without any unnatural movement.

The eighth invention relates to a video switching processing apparatus according to the seventh invention, and is featured by that an image updated by the display means when images are switched are switched from one of the top, base, left, and right end of the screen or in combination of the vertical and horizontal directions of the screen based on the setting by the write area operation circuit.

According to the eighth invention, the screen is updated, while images are switched, from one of the top, base, left, and right end of the screen (that is, from top to base of the screen, from base to top of the screen, from left right of the screen, or from right to left of the screen), or in combination of the vertical and horizontal directions of the screen (diagonally on the screen, for example, from left top to right base on the screen) depending on how to determine the number n (n is a fixed value) of increased lines or picture elements.

The ninth invention relates to a video switching processing apparatus according to the seventh invention, and is featured by that a reference signal of the read control circuit is a stable synchronous signal other than the synchronous signal based on the displayed video signal.

According to the ninth invention, displayed images can be prevented from being trembling vertically when the images are switched, thereby displaying stable images.

The tenth invention relates to a video switching processing apparatus capable of displaying two images, that is, a main image and a sub-image, arranged horizontally on the display screen and switch-processing the two images respectively using video memory.

The apparatus comprises:

first video circuit for switching and outputting an input video signal;

second video circuit for switching and outputting an input video signal;

first A/D converting circuit for A/D converting a video signal from the first video circuit;

second A/D converting circuit for A/D converting a video signal from the second video circuit;

operating means for instructing a switch of video signals provided from the first and second video circuits to the first and second A/D converting circuits;

first video memory for storing a digital video signal from the first A/D converting circuit;

second video memory for storing a digital video signal from the second A/D converting circuit;

first write control circuit for generating a write control signal and writing the digital video signal to the first video memory;

second write control circuit for generating a write control signal and writing the digital video signal to the second video memory;

control means for controlling switching a video signal in at least one of the first and second video circuits by generating a video switch signal according to an instruction to switch the video signal from the operating means, and for controlling stopping a write to at least one of the first and second video memory for a predetermined period after a video switch instruction by controlling at least one of the first and second write control circuits according to the video switch signal;

first write area operation circuit for starting a write to every other field in the first video memory by controlling the first write control circuit after stopping the write in the predetermined period by the control means, determining the number n of lines or the number n (n is a fixed value) of picture elements increased in one writing operation, and setting a write area by performing an operation of n×m, that is, multiplying n by the number m of writing operations (m is a natural number) to set a write area;

second write area operation circuit for starting a write to every other field in the second video memory by controlling the second write control circuit after stopping the write in the predetermined period by the control means, determining the number n of lines or the number n (n is a fixed value) of picture elements increased in one writing operation, and setting a write area by performing an operation of n×m, that is, multiplying n by the number m of writing operations (m is a natural number) to set a write area;

first screen update termination determination circuit for comparing the operation result of n×m from the first write area operation circuit with a predetermined end-of-write position, generating a screen update termination signal for changing the write to the first video memory into a frame write (a write to every field) when the operation result n×m reaches the end-of-write position and thereby the video switching process is completed, and providing the signal for the first write area operation circuit;

second screen update termination determination circuit for comparing the operation result of n×m from the second write area operation circuit with a predetermined end-of-write position, generating a screen update termination signal for changing the write to the second video memory into a frame write (a write to every field) when the operation result n×m reaches the end-of-write position and thereby the video switching process is completed, and providing the signal for the second write area operation circuit;

first read control circuit for generating a read control signal and reading a digital video signal from the first video memory;

second read control circuit for generating a read control signal and reading a digital video signal from the second video memory;

means for setting a read of the first video memory to a one-field read, in a term from the stop of a write to the first video memory by the control means to the completion of the video switching process by the first screen update termination determination circuit, and for changing the one-field read into a frame read (a read of every field) after the term;

means for setting a read of the second video memory to a one-field, in a term from the stop of a write to the second video memory by the control means to the completion of the video switching process by the second screen update termination determination circuit, and for changing the one-field read into a frame read (a read of every field) after the term;

first D/A converting circuit for D/A converting the output from the first video memory;

second D/A converting circuit for D/A converting the output from the second video memory;

synthesizing means for synthesizing an analog signal from the first D/A converting circuit with an analog video signal from the second D/A converting circuit; and display means for displaying a display signal based on the synthesized video signal from the synthesizing means.

According to the tenth invention, not only when images on sub-screens are switched in the 2-screen display mode, but also when a main screen image is switched, images are switched such that a switched-to image (new image) can gradually spread over the still image in the one-field display mode after a screen is set still on one field. Such video switching process can be performed simultaneously for a main screen and a sub-screen.

The eleventh invention relates to a video switching processing apparatus according to the tenth invention, and is featured by that at least one of the main image and the sub-image updated by the display means when at least the one of the main image and the sub-image are switched are switched from one of the top, base, left, and right end of at least one of the main screen and the sub-screen or in combination of the vertical and horizontal directions of the screen based on the setting by at least one of the first and the second write area operation circuits.

According to the eleventh invention, as in the eighth invention, on at least one of the main screen and the sub-screen in the apparatus capable of 2-screen display, the screen is updated, while images are switched, from one of the top, base, left, and right end of the screen (that is, from top to base of the screen, from base to top of the screen, from left right of the screen, or from right to left of the screen), or in combination of the vertical and horizontal directions of the screen (diagonally on the screen, for example, from left top to right base on the screen).

The twelfth invention relates to a video switching processing apparatus according to the tenth invention, and is featured by that the reference signals of the first and second read control circuits are stable synchronous signals other than the synchronous signal based on the displayed video signal.

According to the twelfth invention, as in the ninth invention, even in the apparatus capable of 2-screen display, displayed images are prevented from being trembling vertically, etc. when images on at least one of the main screen and the sub-screen are switched, thereby displaying the images in a stable state.

BRIEF DESCRIPTION OF THE DRAWINGS

FIG. 10 is a block diagram showing a video switching processing apparatus according to the fifth embodiment of the present invention;

FIGS. 11(a) through (d) are timing charts showing the video switching operation shown in FIG. 10;

FIGS. 18(a) through (d) are timing charts showing the video switching processing operation in FIG. 17.

DETAILED DESCRIPTION OF THE PREFERRED EMBODIMENTS

Figure 1:
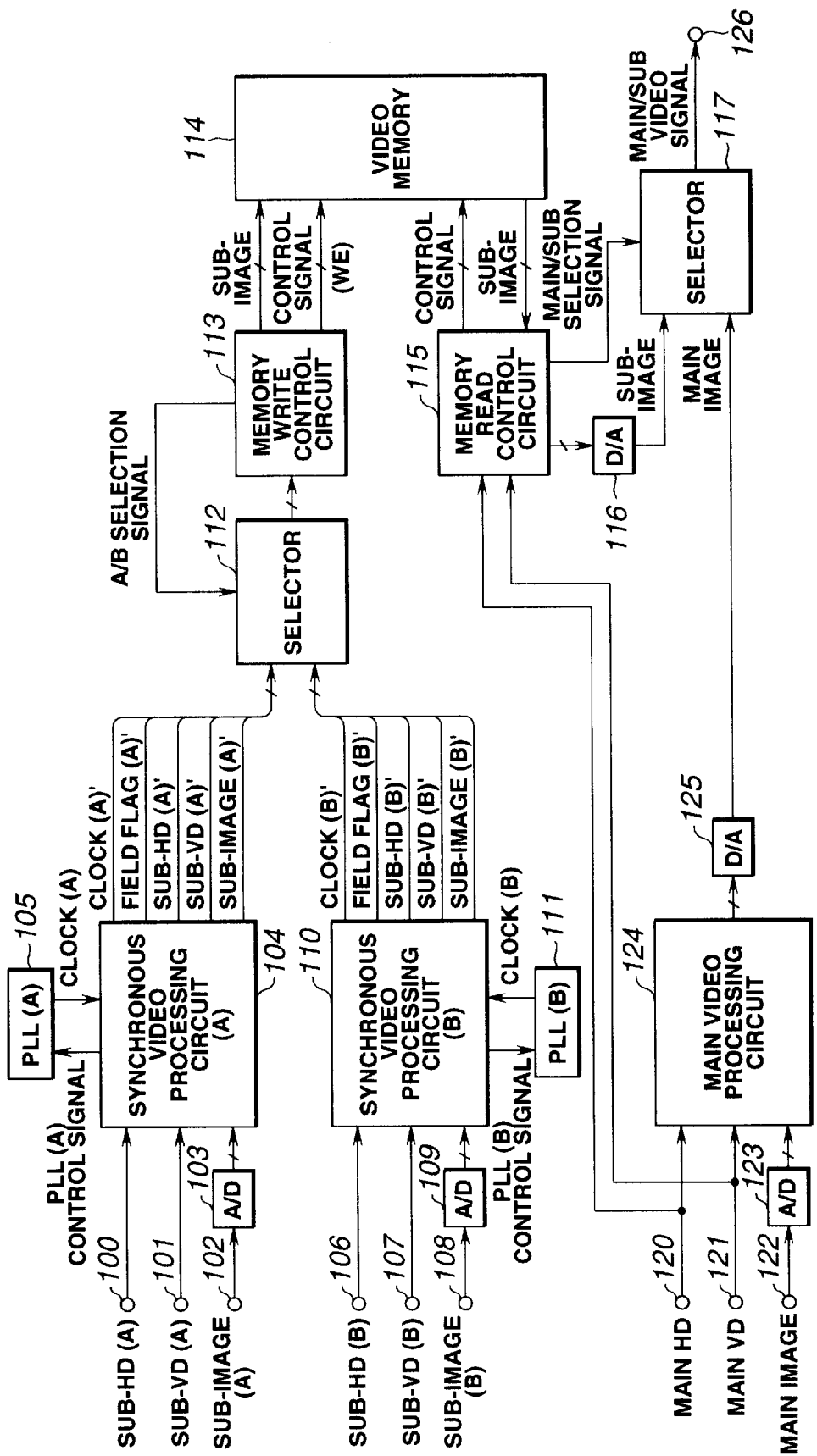
FIG. 1 is a block diagram showing a multi-screen display apparatus according to the first embodiment of the present invention.
Figure 2:
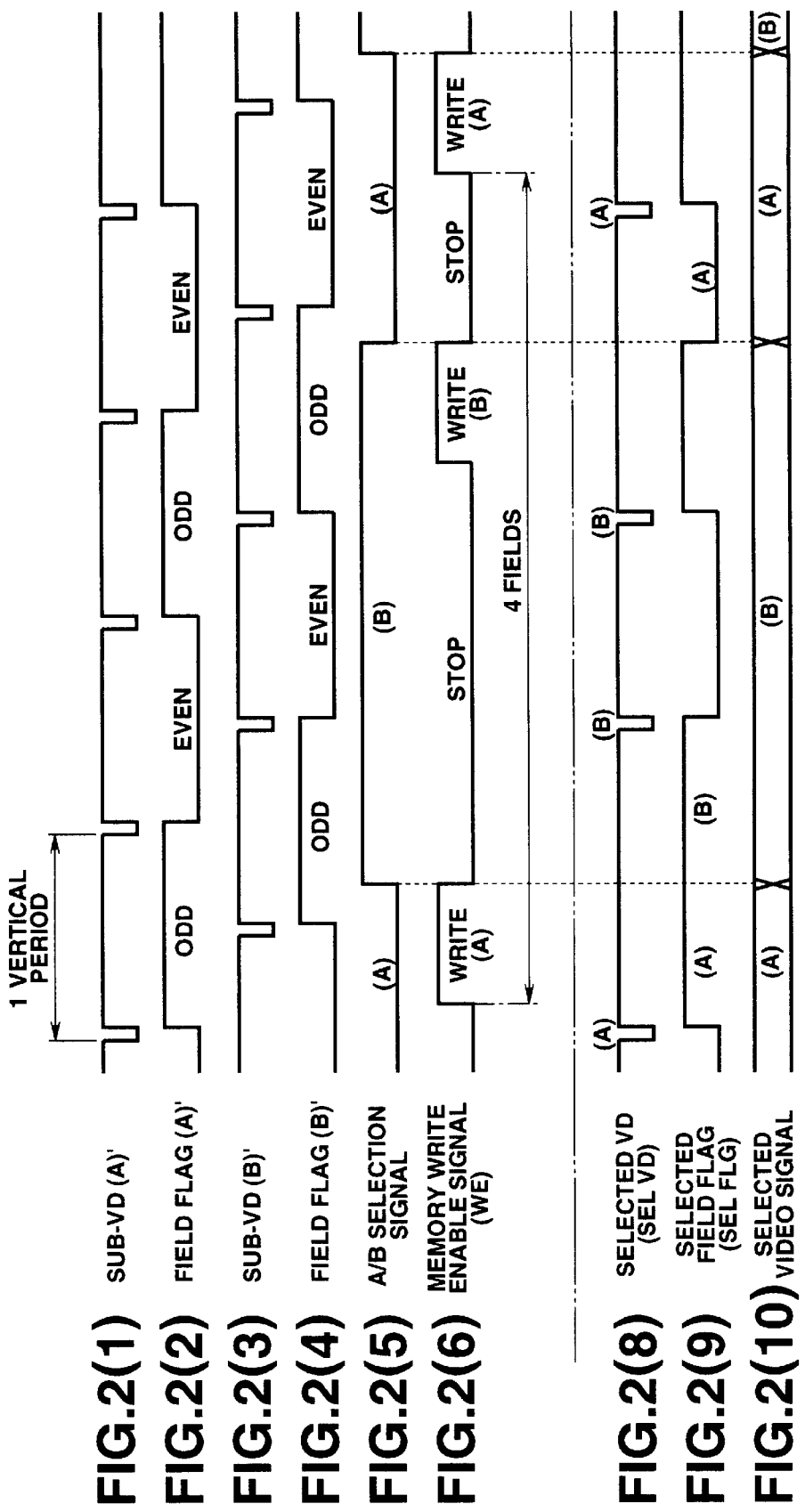
FIGS. 2(1) through (6), and (8) through (10) are timing charts showing the sub-screen processing operation shown in FIG. 1.

The embodiments of the present invention are described below by referring to the attached drawings;

FIG. 1 is a block diagram showing a multi-screen display apparatus according to the first embodiment of the present invention. FIGS. 2(1) through (6), (8) through (10), and FIGS. 3(1) through (6), and (10) are timing charts showing the sub-screen processing operation performed by the apparatus shown in FIG. 1.

In FIG. 1, a horizontal synchronous signal (sub-HD(A)), and a vertical synchronous signal (sub-VD(A)), and a video signal (sub-image (A)) in the A system in which a sub-screen process is performed are input to the input terminals 100, 101, and 102. Among them, the signals of sub-HD(A) and sub-VD(A) input to the input terminals 100 and 101 respectively are provided for the synchronous video processing circuit 104, and the signal of the sub-image (A) is converted into a digital signal by the A/D converter 103, and then provided to the synchronous video processing circuit 104.

The synchronous video processing circuit 104 detects the clock phase error using the input sub-HD(A) and the signal optionally dividing the clock (A), outputs them to the PLL circuit 105 as control signals, controls a clock frequency of the PLL circuit 105, and generates a system clock (A)'.

The synchronous video processing circuit 104 generates a horizontal reference pulse HD (A)' and a vertical reference pulse VD (A)' (sub-HD(A)' and sub-VD(A)') from the input signals (sub-HD(A), sub-VD(A), and sub-image (A)) based on the system clock (A)', determines an odd field (ODD) or an even field (EVEN) of a video signal based on the input sub-VD(A) and generates a field flag (A)', performs an operation process such as a video compressing process on the sub-image (A) and generates a sub-image (A)', and provides the compressed video signal (A)' in the A system and each of the control signals (the system clock, horizontal and vertical reference pulses, and field flag) for a selector 112. The selector 112 forms part of the selection switching means.

The synchronous video processing circuit 104 comprises a first synchronous video processing means for inputting a sub-image (A), a sub-HD(A), and a sub-VD(A), and generating a sub-image (A)', a horizontal and vertical reference pulses HD(A)' and VD(A)', and a system clock (A)', and first field determining means for determining whether the video field is an odd field or an even field.

Similarly, a horizontal synchronous signal (sub-HD(B)), and a vertical synchronous signal (sub-VD(B)), and a video signal (sub-image (B)) in the B system in which a sub-screen process is performed are input to the input terminals 106, 107, and 108. Among them, the signals of sub-HD(B) and sub-VD(B) input to the input terminals 106 and 107 respectively are provided for the synchronous video processing circuit 110, and the signal of the sub-image (B) input to the input terminal 108 is converted into a digital signal by the A/D converter 109, and then provided to the synchronous video processing circuit 110.

The synchronous video processing circuit 110 detects the clock phase error using the input HD(B) and the signal optionally dividing the clock (B), outputs them to the PLL circuit 111 as control signals, controls a clock frequency of the PLL circuit 111, and generates a system clock (B)'.

The synchronous video processing circuit 110 generates a horizontal reference pulse HD (B)' and a vertical reference pulse VD (B)' (sub-HD(B)' and sub-VD(B)') from the input signals (sub-HD(B), sub-VD(B), and sub-image (B)) based on the system clock (B)', determines an odd field (ODD) or an even field (EVEN) of a video signal based on the input sub-VD(B) and generates a field flag (B)', performs an operation process such as a video compressing process on the sub-image (B) and generates a sub-image (B)', and provides the compressed video signal (B)' in the B system and each of the control signals (the system clock, horizontal and vertical reference pulses, and field flag) for a selector 112.

The synchronous video processing circuit 110 comprises a second synchronous video processing means for inputting a sub-image (B), a sub-HD(B), and a sub-VD(B), and generating a sub-image (B)', a horizontal and vertical reference pulses HD(B)' and VD(B)', and a system clock (B)', and second field determining means for determining whether the video field is an odd field or an even field.

The selector 112 as a selection switching means switches a video signal and each control signal in the A or B system according to the A/B selection signal provided from the memory write control circuit 113, and outputs to the memory write control circuit 113.

The memory write control circuit 113 comprises a write means and a write interval variable means. The write means of the memory write control circuit 113 generates various control signals from video signals and control signals provided from the selector 112, and outputs a video signal to the memory 114 and a memory write control signal of the memory 114.

The write interval variable means in the memory write control circuit 113 controls the write means in the memory write control circuit 113 depending on the vertical synchronous phase relationship of the sub-image (A) and the sub-image (B) such that the signals of the sub-image (A)' and (B)' can be written to the memory 114 at 2N field (N is a natural number) intervals.

The operation of the memory write control circuit 113 is described below by referring to the timing chart in FIGS. 2(1) through (6), and (8) through (10). FIGS. 2(1) through (6) and (8) through (10) show the cases in which the phase relationship (including odd and even numbers of a field) of the vertical synchronous signals VD(A) and VD(B) of the sub-image (A) and the sub-image (B) is in the state other than the specified state. The state other than the specified state practically indicates a case in which the vertical synchronization of the sub-image (A) and the sub-image (B) refers to phase synchronization, and ranges within about half vertical period, that is, about ½ field period before or after the phase synchronization.

When the power source is reset, the memory write control circuit 113 sets the A/B selection signal at an L level as shown in FIG. 2(5) such that the sub-image (A)' can be written. Thus, the selector 112 selects an output from the synchronous video processing circuit 104 and outputs the sub-VD(A)' shown in FIG. 2(1) and the field flag (A)' shown in FIG. 2(2). Similarly, the sub-HD(A)' and the sub-image (A)' are output from the selector 112. During the H-level period (ODD period) of the field flag (A)', a memory write enable signal (WE) shown in FIG. 2(6) is output to the memory 114, and the sub-image (A)' is written. Thus, the sub-image (A)' is written to one field in a horizontally and vertically compressed state to the area A in the memory 114.

The memory write control circuit 113 changes the A/B selection signal from the L level to the H level at the end of the output of the memory write enable signal (WE) and switches the output of the selector 112 to the B system. As a result, the sub-VD(B)' shown in FIG. 2(3) and the field flag (B)' shown in FIG. 2(4) are provided for the memory write control circuit 113. Simultaneously, the sub-HD(B)' and the sub-image (B)' are provided from the selector 112.

Then, when a predetermined time has passed after the A/B selection signal is at the H level, the memory write control circuit 113 outputs the WE to the memory 114 in the field (ODD period) in which the field flag (B)' is at the H level, and writes the sub-image (B)' to the memory 114. As a result, the sub-image (B)' is written to one field of the area B in the memory 114 in the horizontally and vertically compressed state.

As described above, the memory write control circuit 113 alternately writes the sub-images in the A and B systems to the areas A and B in the memory 114 one field by one field. FIG. 2(8) shows the selected sub-VD (SEL VD). FIG. 2(9) shows the selected field flag (SEL FLG). FIG. 2(10) shows the selected video signal.

A horizontal synchronous signal (main HD), a vertical synchronous signal (main VD), and a video signal (main video signal) on the main screen are respectively input to the terminals 120, 121, and 122. The main HD and the main VD are provided respectively for the memory read control circuit 115 and the main video processing circuit 124. The main video signal (main image) is converted into digital data by the A/D converter 123 by the A/D converter 123, and is provided for the main video processing circuit 124.

After the main video processing circuit 124 has performed, for example, a compressing process, etc. on a main screen video signal, the D/A converter 125 converts the compressed signal into an analog signal, and provides it for the selector 117.

On the other hand, the two sets of video signals written to the memory 114 are provided for the memory read control circuit 115. The sub-screen A and the sub-screen B are read by the control signal output from the memory read control circuit 115 to the memory 114 based on the main HD and the main VD input from the input terminals 120 and 121.

The read video signal is processed by the memory read control circuit 115 in an output process, etc. such as a phase adjustment of a luminance signal and a chrominance signal, converted into analog data by the D/A converter 116, and provided for the selector 117.

In the selector 117, using the main/sub selection signal output from the memory read control circuit 115, screens are switched at a predetermined position in a 1-horizontal scanning period such that the main screen signal and the synthesized signal of the sub-screen A and the sub-screen B can be displayed in the main/sub screen mode (2 screens display mode) as shown in FIG. 10. Then, a main/sub synthesized video signal (main/sub video signal) is output to the terminal 126.

Thus, in FIG. 2, the write field of the sub-image (A)' and the sub-image (B)' to the memory 114 is fixed to one field, for example, an odd field (ODD), thereby removing flickering characters, etc. due to line flicker. In the above explanation, the write field to the memory 114 is fixed to an odd field (ODD). However, it is obvious that the write field also can be fixed to an even field (EVEN) with the same display effect.

In the embodiment shown in FIG. 1, the case in which the phase relationship (including the odd and even number of the field) of the vertical synchronous signal VD(A) and VD(B) of the sub-image (A) and the sub-image (B) is in a specified state is described below by referring to the timing charts in FIGS. 3(1) through (6), and (10). A specified phase relationship practically indicates a case in which the vertical synchronization relationship of the sub-image (A) and the sub-image (B) refers to a shift by about one vertical period, that is, about 1 field period from phase synchronization state. Namely, the sub-image (A) and the sub-image (B) have the field phase relationship that one is an odd field and the other is an even field, indicating the opposite phases to each other. In this case, the write interval variable means of the memory write control circuit 113 automatically varies the switching timing of the A/B selection signal so that the field update interval on the sub-screen can be shorter than the interval in the case shown in FIG. 2, thereby obtaining a state closer to the state of moving pictures.

Figure 3:
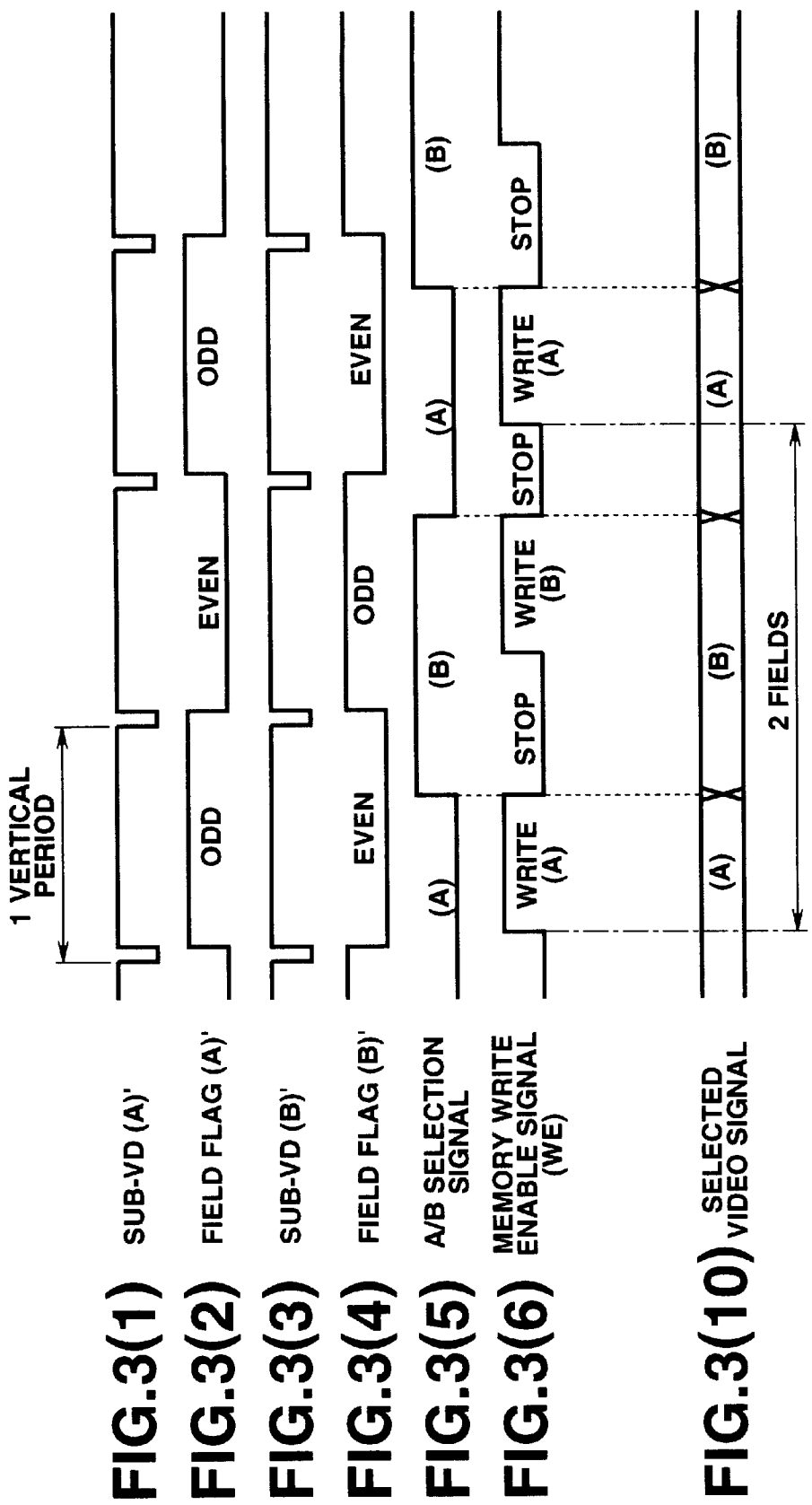
FIGS. 3(1) through (6), and (10) are timing charts showing the sub-screen processing operation shown in FIG. 1.

In the timing charts in FIGS. 3(1) through (6), and (10), when the power source is reset, the memory write control circuit 113 sets the A/B selection signal at an L level as shown in FIG. 3(5) such that the sub-image (A) can be written. Thus, the selector 112 selects an output from the synchronous video processing circuit 104 and outputs the sub-VD(A)' shown in FIG. 3(1) and the field flag (A)' shown in FIG. 3(2). Similarly, the sub-HD(A)' and the sub-image (A)' are output from the selector 112. During the H-level period (ODD period) of the field flag (A)', a memory write enable signal (WE) shown in FIG. 3(6) is output to the memory 114, and the sub-image (A)' is written. Thus, the sub-image (A)' is written to one field in a horizontally and vertically compressed state to the area A in the memory 114. FIG. 3(10) shows a video signal after the selection by the selector 112.

The memory write control circuit 113 changes the A/B selection signal from the L level to the H level at the end of the output of the memory write enable signal (WE) and switches the output of the selector 112 to the B system. As a result, the sub-VD(B)' shown in FIG. 3(3) and the field flag (B)' shown in FIG. 3(4) are provided for the memory write control circuit 113. Simultaneously, the sub-HD(B)' and the sub-image (B)' are provided from the selector 112.

Then, the memory write control circuit 113 outputs the WE to the memory 114 in the field in which the field flag (B)' is at the H level after the A/B selection signal first indicates the H level, and writes the sub-image (B) to the memory 114. As a result, the sub-image (B)' is written to one field to the area B in the memory 114 in the horizontally and vertically compressed state.

In FIGS. 2(1) through (6), (8) through (10), and in FIGS. 3(1) through (6), and (10), when the vertical synchronous phase relationship of the sub-screen (A) and the sub-screen (B) reaches a specified state, the write intervals to the memory 114 is automatically set to 2 fields. In other phase relationships, the sub-screen (A) and the sub-screen (B) can be written to the memory 114 at intervals equal to or longer than four fields. The write interval is set to longer than four fields, because it is required in case that an input signal of one sub-screen cannot be input (detected) by an external disturbance.

As described above, since the write field interval of the sub-screen (A) and the sub-screen (B) can be automatically switched to 2N fields (N is a natural number) depending on the state of the vertical synchronous phase relationship of the sub-screen (A) and the sub-screen (B), the sub-screen in the multi-screen display mode can reach the state of perfect moving pictures.

Figure 4:
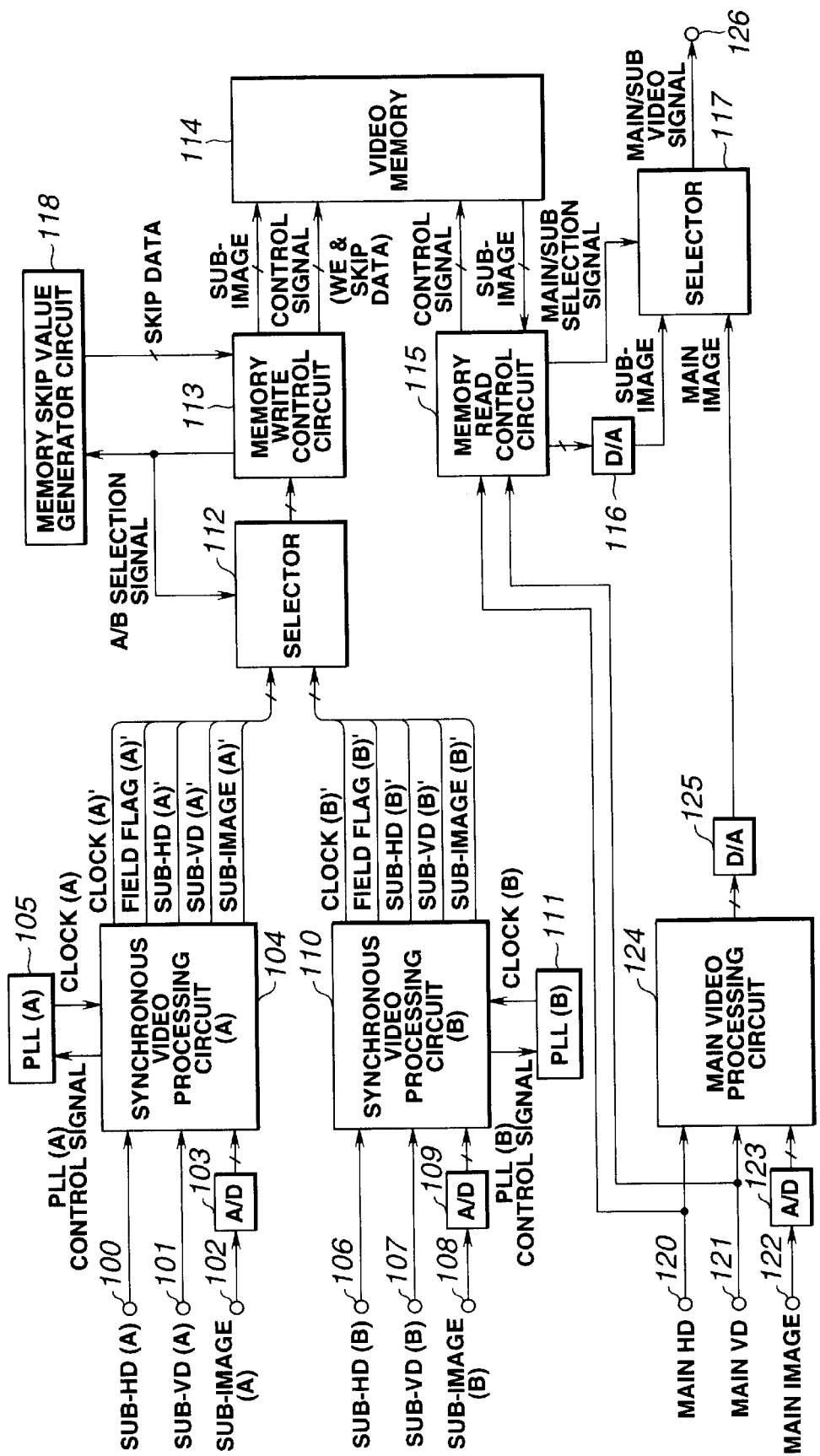
FIG. 4 is a block diagram showing a multi-screen display apparatus according to the second embodiment of the present invention.
Figure 5:
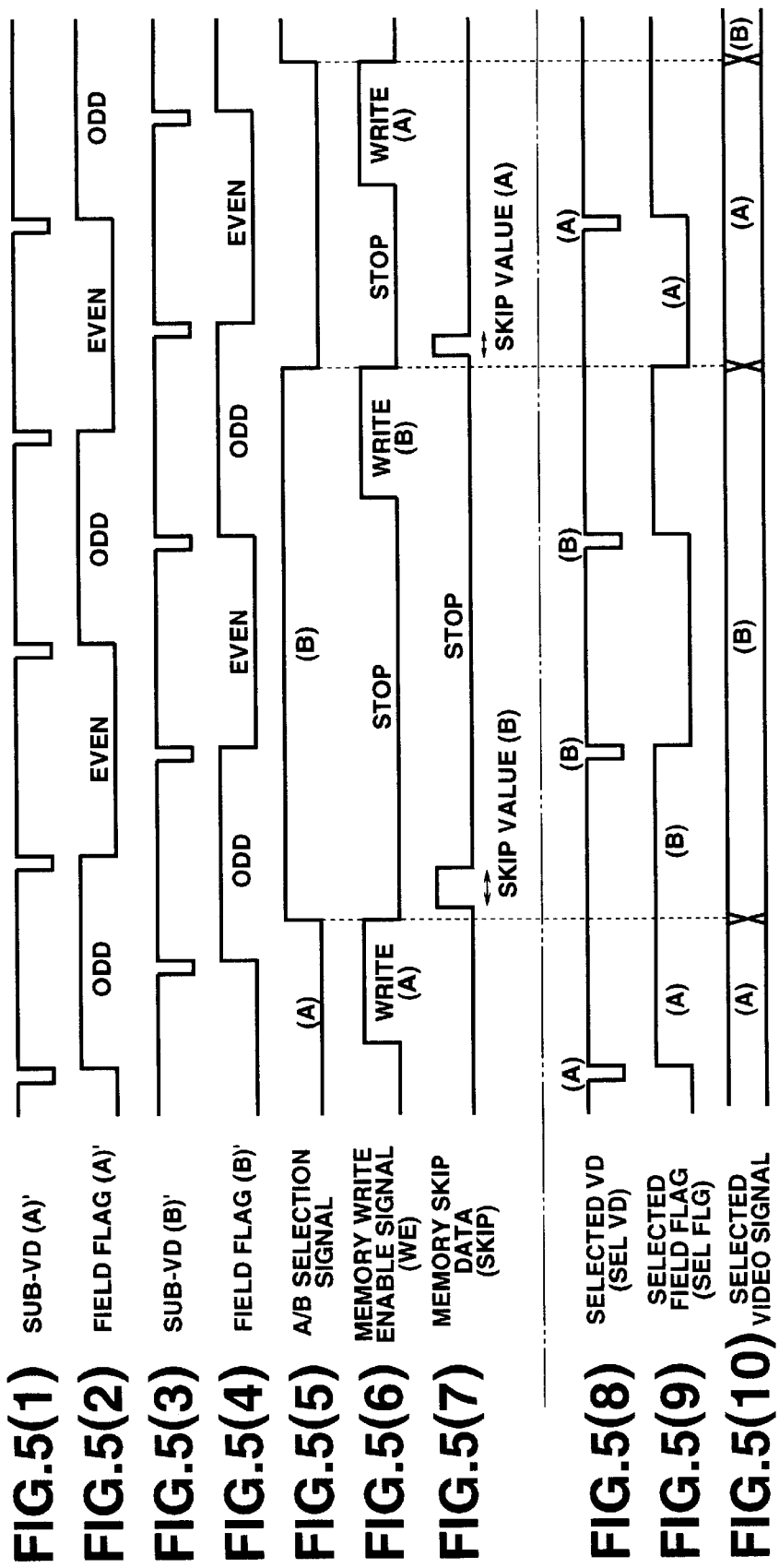
FIGS. 5(1) through (10) are timing charts showing the sub-screen processing operation shown in FIG. 4.
Figure 6:
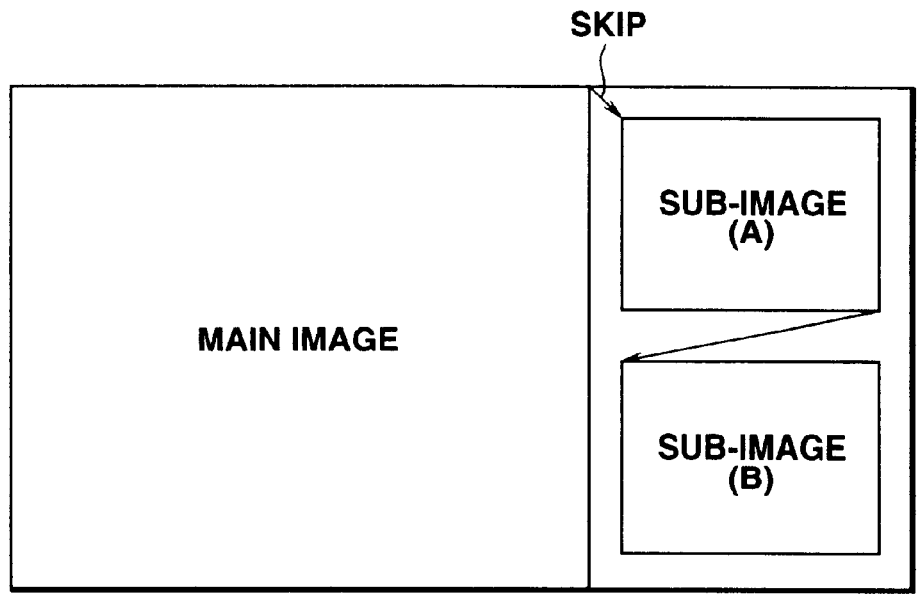
FIG. 6 shows a display example of the sub-screen processing operation shown in FIG. 5.
Figure 7:
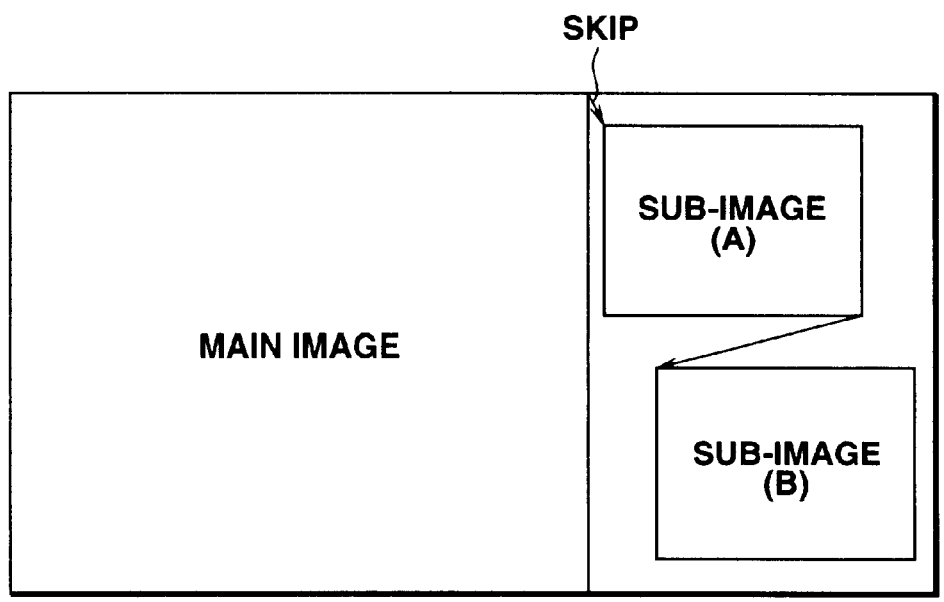
FIG. 7 shows another display example of the sub-screen processing operation shown in FIG. 5.

FIG. 4 is a block diagram showing a multi-screen display apparatus according to the second embodiment of the present invention. FIGS. 5(1) through (10) are timing charts showing the sub-screen processing operation in the apparatus shown in FIG. 4. FIG. 6 shows a display example of the sub-screen processing operation shown in FIG. 5. FIG. 7 shows another display example of the sub-screen processing operation shown in FIG. 5.

According to the second embodiment of the present invention, the write position to the memory 114 on the sub-screen (A) and the sub-screen (B) can be independently adjusted.

In FIG. 4, a horizontal synchronous signal (sub-HD(A)), and a vertical synchronous signal (sub-VD(A)), and a video signal (sub-image (A)) in the A system in which a sub-screen process is performed are input to the input terminals 100, 101, and 102. Among them, the signals of sub-HD(A) and sub-VD(A) input to the input terminals 100 and 101 respectively are provided for the synchronous video processing circuit 104, and the signal of the sub-image (A) input to the input terminal 102 is converted into a digital signal by the A/D converter 103, and then provided to the synchronous video processing circuit 104.

The synchronous video processing circuit 104 detects the clock phase error using the input sub-HD(A) and the signal optionally dividing the clock (A), outputs it to the PLL circuit 105 as control signals, controls a clock frequency of the PLL circuit 105, and generates a system clock (A)'.

The synchronous video processing circuit 104 generates a horizontal reference pulse HD (A)' and a vertical reference pulse VD (A)' (sub-HD(A)' and sub-VD(A)') from the input signals based on the system clock (A)', determines an odd field (ODD) or an even field (EVEN) of a video signal based on the input sub-VD(A) and generates a field flag (A)', performs an operation such as a video compressing process on the sub-image (A) and generates a sub-image (A)', and provides the video signal (A)' in the A system and each of the control signals for a selector 112. The selector 112 forms the selection switching means.

The synchronous video processing circuit 104 comprises a first synchronous video processing means for inputting a sub-image (A), a sub-HD(A), and a sub-VD(A), and generating a sub-image (A)', a horizontal and vertical reference pulses HD(A)' and VD(A)', and a system clock (A)', and first field determination means for determining whether the video field is an odd field or an even field.

Similarly, a horizontal synchronous signal (sub-HD(B)), and a vertical synchronous signal (sub-VD(B)), and a video signal (sub-image (B)) in the B system in which a sub-screen process is performed are input to the input terminals 106, 107, and 108. Among them, the signals of sub-HD(B) and sub-VD(B) input to the input terminals 106 and 107 respectively are provided for the synchronous video processing circuit 110, and the signal of the sub-image (B) is converted into a digital signal by the A/D converter 109, and then provided to the synchronous video processing circuit 110.

The synchronous video processing circuit 110 detects the clock phase error using the input sub-HD(B) and the signal optionally dividing the clock (B), outputs them to the PLL circuit 111 as control signals, controls a clock frequency of the PLL circuit 111, and generates a system clock (B)'.

The synchronous video processing circuit 110 generates a horizontal reference pulse HD (B)' and a vertical reference pulse VD (B)' (sub-HD(B)' and sub-VD(B)') from the input signals based on the system clock (B)', determines an odd field (ODD) or an even field (EVEN) of a video signal based on the input sub-VD(B) and generates a field flag (B)', performs an operation such as a video compressing process on the sub-image (B) and generates a sub-image (B)', and provides the video signal (B)' in the B system and each of the control signals for a selector 112.

The synchronous video processing circuit 110 comprises a second synchronous video processing means for inputting a sub-image (B), a sub-HD(B), and a sub-VD(B), and generating a sub-image (B)', a horizontal and vertical reference pulses HD(B)' and VD(B)', and a system clock (B)', and second field determination means for determining whether the video field is an odd field or an even field.

The selector 112 as a selection switching means switches a video signal and each control signal in the A or B system according to the A/B selection signal provided from the memory write control circuit 113, and outputs to the memory write control circuit 113.

The memory write control circuit 113 comprises a first write means and a write interval variable means. The first write means of the memory write control circuit 113 generates various control signals from video signals and each of control signals provided from the selector 112, and outputs a video signal and a memory write control signal to the memory 114.

The write interval variable means in the memory write control circuit 113 controls the first write means in the memory write control circuit 113 depending on the vertical synchronous phase relationship of the sub-image (A) and the sub-image (B) such that the signals of the sub-image (A)' and (B)' can be written to the memory 114 at 2N field (N is a natural number) intervals.

In addition to the above described configuration, the present embodiment includes a memory skip value generator circuit 118 as a second write means connected to the memory write control circuit 113. The memory skip value generator circuit 118 inputs an A/B selection signal from the memory write control circuit 113, changes the level of the signal from the L level to the H level or from the H level to the L level, generates skip data for skipping a write address of the memory 114, and provides the data for the memory 114.

That is, the A/B selection signal from the memory write control circuit 113 is provided for the selector 112, and simultaneously for the memory skip value generator circuit 118. The memory skip value generator circuit 118 provides the skip data for the memory write control circuit 113 to skip the write position to the memory 114.

The operation of the memory write control circuit 113 is described below by referring to the timing charts in FIGS. 5(1) through (10).

When the power source is reset, the memory write control circuit 113 sets the A/B selection signal at an L level as shown in FIG. 5(5) such that the sub-image (A) can be written. Thus, the selector 112 selects an output from the synchronous video processing circuit 104 and outputs the sub-VD(A)' shown in FIG. 5(1) and the field flag (A)' shown in FIG. 5(2). Similarly, the sub-HD(A)' and the sub-image (A)' are output from the selector 112. During the H-level period (ODD period) of the field flag (A)', a memory write enable signal (WE) shown in FIG. 5(6) is output to the memory 114, and the sub-image (A)' is written.

The memory write control circuit 113 changes the A/B selection signal from the L level to the H level at the end of the output of the memory write enable signal (WE) and switches the output of the selector 112 to the B system. As a result, the sub-VD(B)' shown in FIG. 5(3) and the field flag (B)' shown in FIG. 5(4) are provided for the memory write control circuit 113.

Now, the WE signal of the sub-image (A)' is provided for the memory 114 and the sub-image (A)' is written. When the write is completed, and the A/B selection signal is changed from the L level to the H level as shown in FIG. 5(5) as described above, the memory skip value generator circuit 118 of FIG. 4 provides the skip data of the sub-image (B)' shown in FIG. 5(7) for the memory 114 through the memory write control circuit 113. Through the memory skip data shown in FIG. 5(7), the write position of the sub-image (B) to the memory can be skipped by an optional address period from the last address at which the sub-image (A)' is written to the memory.

And, in the field (ODD) after the memory skip data is output, during the H level of the A/B selection signal, and when the field flag (B)' first enters the H level, the WE signal shown in FIG. 5(6) is output (the WE indicates the H level), and one field of the horizontally and vertically compressed sub-image (B)' is written to the area B in the memory 114. As a result, the sub-image (B)' can be written as skipped to an optional position (address) of the area B in the memory 114.

In the repetitive operations, the WE signal of the sub-image (B)' is provided from the memory write control circuit 113 to the memory 114, and the sub-image (B)' is then written thereto. When the write is completed, the A/B selection signal becomes the L level, and the memory skip value generator circuit 118 shown in FIG. 4 provides the skip data of the sub-image (A)' for the memory 114 through the memory write control circuit 113. Using the memory skip data, the write position of the sub-image (A)' to the memory can be skipped by an optional address period from the address 0 of the memory.

And, in the field (ODD) after the memory skip data is output, during the L level of the A/B selection signal, and when the field flag (A)' first enters the H level, the WE signal shown in FIG. 5(6) is output (the WE indicates the H level), and one field of the horizontally and vertically compressed sub-image (A)' is written to the area A in the memory 114. As a result, the sub-image (A)' can be written as skipped to an optional position (address) of the area A in the memory 114.

Afterwards, the write position of the sub-image (A)' and the sub-image (B)' to the memory 114 can be independently adjusted by repeating the operations. FIG. 5(8) shows the VD selected by the selector 112. FIG. 5(9) shows the field flag after the selection. FIG. 5(10) shows the video signal after the selection. Since the reading operations for the sub-image (A)' and the sub-image (B)' from the memory 114, and the operation of a main screen signal processing system are the same as those according to the first embodiment of the present invention, the detailed explanation is omitted here.

Figure 15:
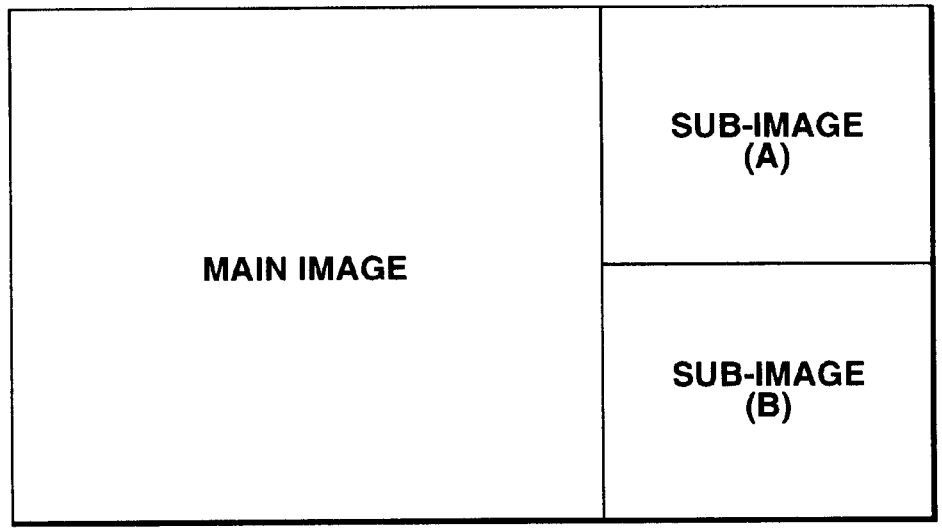
FIG. 15 shows an example of displaying multi-screens.
Figure 16:
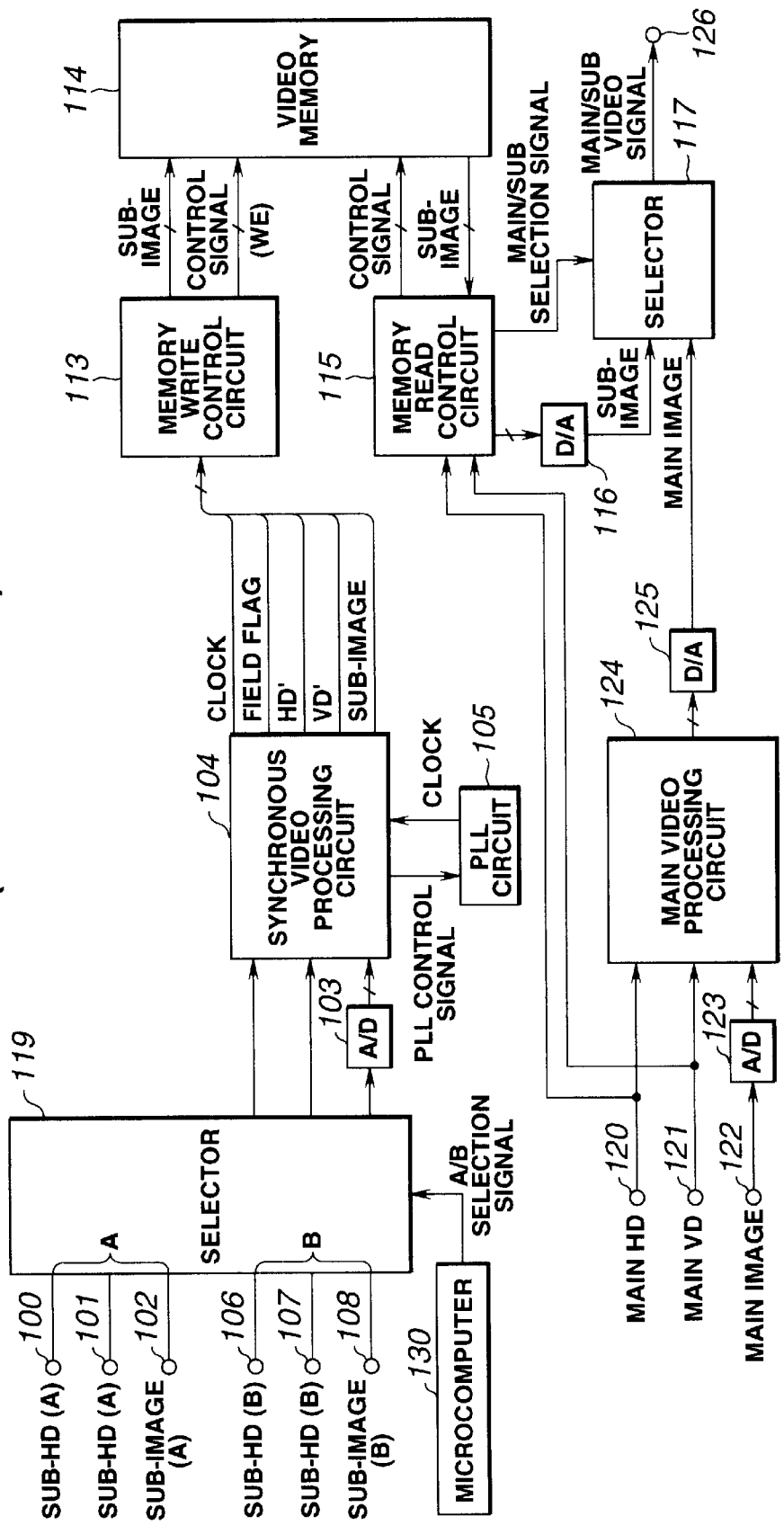
FIG. 16 is a block diagram showing the configuration of the conventional multi-screen display apparatus.

FIG. 6 shows a display example according to the second embodiment shown in FIGS. 4 and 5. As compared with the conventional sub-image (A) shown in FIG. 15, the display position of the sub-image (A) shown in FIG. 6 is displayed as shifted from the address 0 of the memory 114 by the skip value. The sub-image (B) shown in shown in FIG. 6 is displayed at the position shifted from the last address of the sub-image (A) written to the memory 114 by the skip value. In this example, the memory write position is skipped, and simultaneously, and the compression rate of the sub-image in the memory write control circuit 113 is set to a large value for display.

FIG. 7 shows another display example of the second embodiment. As compared with the display example shown in FIG. 6, the sub-image (A) has a smaller skip value for a write to the memory and the sub-image (B) is displayed with the skip value set large from the last address at which the sub-image (A) is written to the memory 114.

Figure 8:
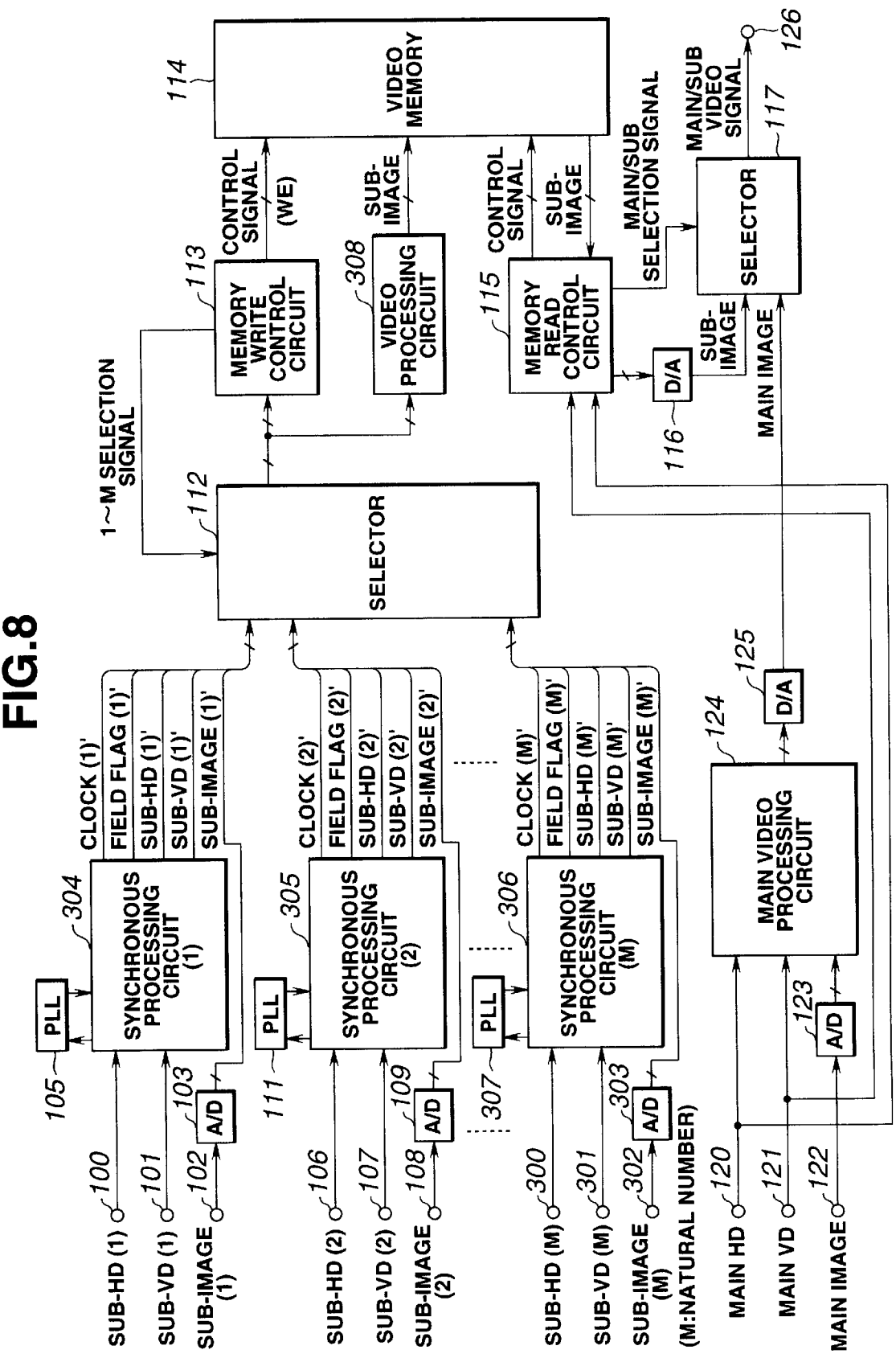
FIG. 8 is a block diagram showing a multi-screen display apparatus according to the third embodiment of the present invention.

FIG. 8 is a block diagram showing a multi-screen display apparatus according to the third embodiment of the present invention. The basic configuration is the same as that according to the first embodiment of the present invention. Therefore, the detailed explanation is omitted here.

The third embodiment of the present invention is realized by applying M (M is a natural number) input systems of sub-screens in the multi-screen display to the above described embodiments of the present invention, and comprises M synchronous processing circuits 304 through 306, and PLL circuits 105, 111, and 307 for generating a clock. As the first input signals, the sub-HD(1), the sub-VD(1), and the sub-image (1) are input respectively to the input terminals 100, 101, and 102. As the second input signals, the sub-HD(2), the sub-VD(2), and the sub-image (2) are input respectively to the input terminals 106, 107, and 108. As the M-th input signals, the sub-HD(M), the sub-VD(M), and the sub-image (M) are input respectively to the input terminals 300, 301, and 302. The synchronous processing circuit 304 only inputs the sub-HD(1) and the sub-VD(1) to be input to the input terminals 100 and 101, and outputs various synchronized signals (system clock (1)', horizontal reference pulse HD(1)', vertical reference pulse VD(1)') to the selector 112. The synchronous processing circuit 305 only inputs the sub-HD(2) and the sub-VD(2) to be input to the input terminals 106 and 107, and outputs various synchronized signals (system clock (2)', horizontal reference pulse HD(2)', vertical reference pulse VD(2)') to the selector 112. The synchronous processing circuit 306 only inputs the sub-HD (M) and the sub-VD(M) to be input to the input terminals 300 and 301, and outputs various synchronized signals (system clock (M)', horizontal reference pulse HD(M)', vertical reference pulse VD(M)') to the selector 112. The synchronous processing circuits 304, 305, and 306 comprises a synchronous processing means for processing the sub-HD and the sub-VD and generating a system clock, a horizontal and a vertical reference pulse, an HD', and a VD'; and a field determining means for determining whether the field of sub-image is odd or even based on the sub-VD and generating a field flag indicating a determination result. The signals of the sub-images (1), (2), . . . , (M) input to the input terminals 102, 108, and 302 are converted into digital signals by the A/D converters 103, 109, . . . , 303, and output as the sub-images (1)', (2)', . . . , (M)' to the selector 112. In this example, the video processes for the input sub-images (1), (2), . . . , (M) are performed independently of the synchronous processing circuits 304, 305, and 306. The video signal after being selected by the selector 112 is processed in an operation such as the compression by a video processing circuit 308. In this process, a circuit for performing an operation such as image compression in the synchronous processing circuits 304, 305, and 306 can be removed. The memory write control circuit 113 inputs various synchronized signals from the selector 112 (a system clock, a field flag, a sub-HD', a sub-VD'), writes a video signal from the video processing circuit 308 to the memory 114 based on the field determination result (that is, a field flag) using a write control signal (WE) in either an odd field or an even field, generates 1 through M selection signals for switching to any of the sub-screen signals (1)' through (M)', and provides them for the selector 112.

With the configuration, in addition to the operations and effects of the first and second embodiments, by concurrently performing synchronous processes on M input systems, a video signal of either an odd or an even field from each of the M input systems can be written to the memory 114, and read stably within a short time to multi-screen display as a sub-screen (semi-moving pictures) when the selector 112 is switched. As a result, a screen can be updated within a short time without flickering characters in a sub-screen display state close to the state of perfect moving pictures.

Figure 9:
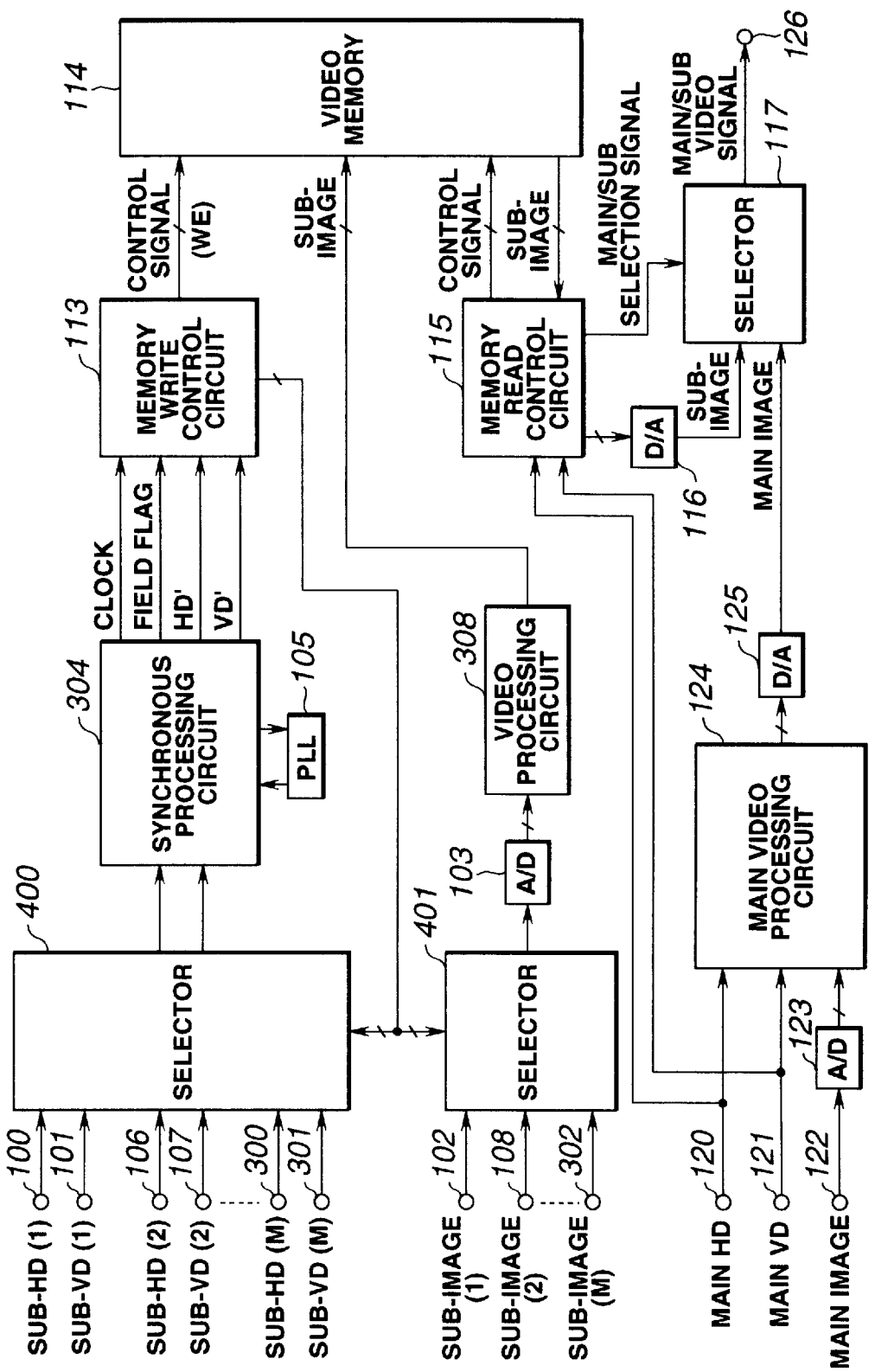
FIG. 9 is a block diagram showing a multi-screen display apparatus according to the fourth embodiment of the present invention.

FIG. 9 is a block diagram showing a multi-screen display apparatus according to the fourth embodiment of the present invention.

According to the fourth embodiment shown in FIG. 9, the number of input systems is M (M is a natural number) in the multi-screen display as in the third embodiment of the present invention. The synchronous signals (sub-HD(1), sub-VD(1), sub-VD(2), sub-VD(2), . . . , sub-HD(M), sub-VD(M)) and video signals (sub-image (1), sub-image (2), . . . , sub-image (M)) in each of the M input systems are selected by separate selectors 400 and 401, and then processed in a synchronous process and a video process.

The selector 400 for synchronous signals has input terminals 100, 101, 106, 107, . . . , 300, 301 of M synchronous signal systems (sub-HD and sub-VD). The selector 401 for video signals has input terminals 102, 108, . . . , 302 of M video signal systems. Each of the selectors 400 and 401 is switched and controlled by the signal (1 through M selection signals) output from the memory write control circuit 113. The synchronous signals (sub-HD and sub-VD) from the selector 400 is provided for a synchronous processing circuit 304. The synchronous processing circuit 304 comprises a synchronous processing means for generating a system clock, a horizontal and a vertical reference pulse HD' and VD'; and a field determining means for determining the field of each sub-image based on the sub-VD and generating a field flag indicating the determination result. The video signal from the selector 401 (sub-image) is converted into a digital signal by the A/D converter 103, and then provided for the synchronous processing circuit 304 for performing an operating process such as compression. The memory write control circuit 113 forms the write means for writing a sub-image to the memory 114. In the memory write control circuit 113, a video signal from the video processing circuit 308 is written to the memory 114 in either an odd field or an even field according to a field flag using a write control signal (WE). Simultaneously, after a video signal is written to the memory 114, the next selection signal is generated to switch the input of the selectors 400 and 401. Thus, a pair of signals are sequentially selected by the selectors 400 and 401 from M synchronous signals and M video signals, and are processed in the synchronous process and the video process respectively. The M video-processed video signals are sequentially written in field units to the memory 114 only in either odd or even fields. The circuit configuration of the signal process of the main screen system is the same as the above described configuration, and the detailed explanation is omitted here.

With the configuration, as compared with the third embodiment of the present invention, all of M synchronous processing circuits 304 are not required, thereby reducing the scale of the circuit. Similarly to the operations and effects according to the first and second embodiments of the present invention, video signals in either odd or even fields from each of the M input systems can be stably written to the memory 114 when the selectors 400 and 401 are switched. As a result, a screen can be updated within a short time without flickering characters in a sub-screen display state closer to the state of moving pictures.

As described above, according to the first through the fourth embodiments of the present invention, sub-images can be stably written to a storing means in one of odd and even fields by setting a field determination result as one of the memory write conditions, thereby suppressing flickering characters due to line flicker and shortening the field update intervals for a write to the storing means. As a result, a sub-screen display can be realized as if the images were perfect moving pictures. Furthermore, the sub-image write position in the storing means can be freely set, thus providing a multi-screen display apparatus capable of independently adjusting a sub-image display position.

Described below is an embodiment for solving the problem with the video switching process described by referring to FIGS. 17 and 18.

FIG. 10 is a block diagram showing a video switching processing apparatus according to the fifth embodiment of the present invention. The present embodiment relates to the video switching processing apparatus using a television receiver.

Figure 17:
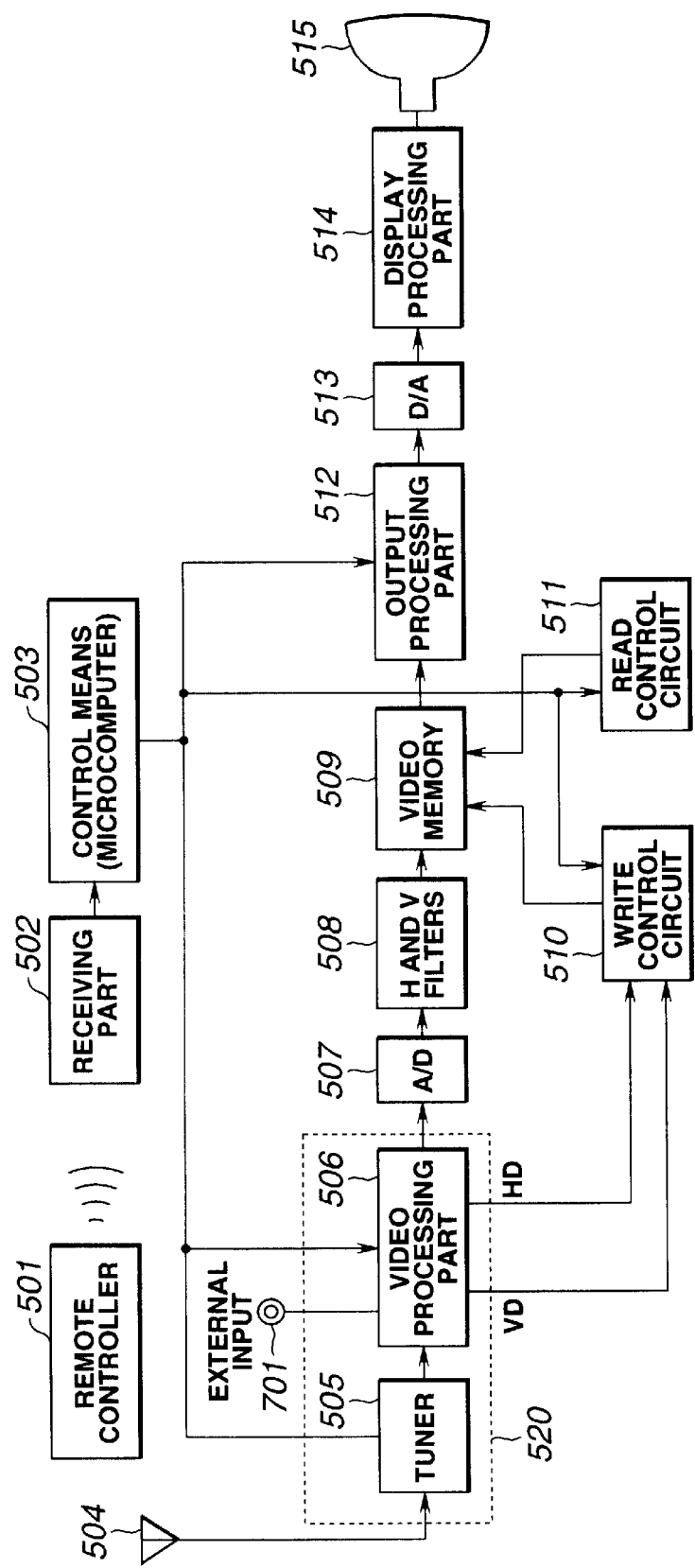
FIG. 17 is a block diagram showing the conventional video switching processing apparatus.

FIG. 10 is different from FIG. 17 in that a write area operation circuit 201 and a screen update termination determination circuit 20 are included.

The entire configuration shown in FIG. 10 is described first. The television broadcast signal from the antenna 504 is selected by the tuner 505 according to the channel information from the control means 503, and transmitted to the video processing part 506. The control means 503 comprises, for example, a microcomputer.

The video processing part 506 detects the video signal contained in the broadcast signal, separates the synchronous signal (vertical synchronous signal VD and horizontal synchronous signal HD) from the video signal, and separates a luminance signal and a chrominance signal to provide the video signal (luminance signal and chrominance signal) for the A/D converting circuit 507. The video processing part 506 comprises an input switching means for switching the video-detected signal in the broadcast signal to or from the video signal from the external input terminal 701. The tuner 505 and the video processing part 506 comprise the video circuit 520 capable of taking in, switching, and outputting an input signal. The A/D converting circuit 507 converts a video signal into a digital signal. On the other hand, the horizontal synchronous signal (HD) and the vertical synchronous signal (VD) from the video processing circuit 506 are provided for the write control circuit 510.

The video signal converted into digital data is provided for the video memory 509 through the H and V filters 508. The H and V filters 508 has the function of horizontally and vertically compressing a digital video signal. When the signal is not compressed, the filter is set such that the signal can pass through the filters. The video memory 509 has, for example, 1-frame capacity.

The write control circuit 510 generates a write control signal such as a memory write enable signal (WE) based on the information from the control means 503 to write the video signal to the video memory 509. The written video signal is read from the video memory 509 by the read control signal such as a read enable signal (RE) generated by the read control circuit 511, and provided for the output processing part 512. Under the control of the write control circuit 510 and the read control circuit 511, the video memory 509 reads in field units one frame of a video signal written to each field, and outputs the read signal as a one-frame video signal.

The control means 503 generates a video switch signal according to an instruction to switch the video signal from the remote controller 501 as an operating means, provides the generated signal for the video circuit 520, the write control circuit 510, and the read control circuit 511, controls switching the video signal in the video circuit 520, controls the write control circuit 510 according to the video switch signal, and controls the write to the video memory 509 to be stopped for a predetermined period after the video switch instruction.

After stopping the write in the predetermined period according to the video switch signal from the control means 503 based on the video switching operation, a write area operation circuit 601 controls the write control circuit 110, starts a write for every other field to the video memory 509, determines the number n (n is a fixed value) of lines or picture elements for one writing operation, performs an operation of n×m (m is a natural number) for m times of writing operations performed for every other field, and switches the write control circuit 510 to the frame writing process according to the screen update termination signal.

A screen update termination determination circuit 602 compares the operation result of n×m from the write area operation circuit 601 with a predetermined write termination position, determines that the screen update has been completed when the operation result of n×m has reached the write termination position, and generates a screen update termination signal to provide it for the write area operation circuit 601.

The output processing part 512 adds a constant direct current (DC) level to an area other than the video period, and adjusts the phase of a luminance signal and a chrominance signal.

After the signal is converted into analog data by the D/A converting circuit 513, the display processing part 514 performs a matrix transformation on the color signal, and displays the result on the CRT display 515.

Then, based on the operation of the remote controller 501 as an operating means, the operation when a video switch signal is issued by the control means 503 to switch the receiving channel from A to B is described below.

When the video switch signal is issued by the control means 503, the write control circuit 510 stops outputting a write enable signal (WE) to stop the images of the channel A. The read control circuit 511 outputs a read enable signal (RE), etc. according to the reference signal based on the vertical synchronous signal (VD) and the horizontal synchronous signal (HD), and displays images.

By stopping outputting the write enable signal (WE), an unstable video signal output during the channel selection by the tuner 505 can be prevented from being written to the video memory 509 (therefore, without displaying unstable images), and a still image of the channel A can be displayed continuously on the CRT display 515 for a predetermined period (until the synchronization becomes stable, for example, for 1 or 2 field period).

After the tuner 505 switches into the channel B, the write by the write control circuit 510 is resumed after the synchronization becomes stable, a field image in either odd or even fields (referred to as one-field image) is written to the video memory 509 for every other field in units of a predetermined number n of lines or picture elements based on the operation result the write area operation circuit 601. That is, for each field, a fraction of lines of a field image or a fraction of picture elements of a field image is set on the still image of the video memory 509 in every other field, that is, overwritten for each frame.

The write area operation circuit 601 determines the number n of increased write lines or picture elements according to the information from the control means 503, multiplies n by m, which refers to the number of writing operations performed for every other field, and provides the operation result of n×m (n is a fixed value, and m is a natural number) for the write control circuit 510 and the screen update termination determination circuit 602.

The screen update termination determination circuit 602 compares the write termination position preliminarily set by the control means 503 with the operation result of n×m. If the operation result of n×m is larger than the number of lines or picture elements corresponding to the write termination position, then it is determined that the screen update control has terminated, and a update termination signal terminating the screen update control termination signal is output to the write area operation circuit 601.

The write area operation circuit 601 switches the write control circuit 510 to a normal frame write process according to the update termination signal.

FIGS. 11(a) through (d) are timing charts of the video switching process by the apparatus shown in FIG. 10. Described below is the video switching process performed in the vertical direction from top to base.

FIG. 11(a) shows a vertical synchronous signal (VD) to the write control circuit 510. FIG. 11(b) shows a write enable signal (WE) from the write control circuit 510 to the video memory 509. FIG. 11(c) shows the display state of the video signal on the CRT display 515.

The operation stops writing the video signal to the write control circuit 510, and displays a still image CHA-n of the channel A by performing a writing operation for each field to display a frame for the channel A at the beginning, and by stopping providing a write enable signal (WE) from the write control circuit 510 to the video memory 509 during the channel selection period in the tuner 505.

After selecting the channel B (CHB) in the present embodiment, the number n of the increased write lines is set to n=number of effective lines/4 as indicated by the write enable signal (WE) shown in FIG. 11(b). Therefore, in one of odd fields and even fields (that is, one field), the number of lines with one-fourth of the number of effective lines added is used in writing to the video memory 509. That is, a one-field write to the video memory 509 is performed by the write enable signal (WE) corresponding to the increased number of write lines (in this case, ¼ of the number of effective lines) in every other field period, that is, every frame period, as shown in FIG. 11(b). Each field is read by the read enable signal (RE) not shown in FIG. 11, and displayed on the CRT display 515. The read control circuit 511 reads each field at the same area in the video memory 509 to realize one-field display. Therefore, as shown in FIG. 11(c), a still image of the channel A (CHA-n) is displayed during at least a one field period corresponding to the channel selection period, and then the next image of the channel B (CHB-1, CHB-3, CHB-5, CHB-7), which is an update image, is displayed so as to spread over the still image (CHA-n) by a predetermined number of lines for 1-frame period (in this example, by ¼ of the number of effective lines) in the subsequent field period.

In this operation, when the image of the channel B (CHB-7) is completely written on the entire screen, the screen update termination determination circuit 202 outputs an update termination signal (for example, a termination flag) shown in FIG. 11(d) indicating that the update process has been completed, and the subsequent processes are returned to the normal frame write process. That is, after one field image (CHB-7) of the channel B has been displayed for 2-field period, that is, 1-frame period, each field is written to display frames for the channel B as shown in FIG. 1(b). Each field is read according to the read enable signal (RE) (not shown in the drawings) each time a field is written according to the write enable signal (WE) for a one-field period. Then, as shown in FIG. 11(c), the field image of the channel B (CHB-9, CHB-10, CHB-11, . . . ) can be displayed in a frame format.

To sum up, when the video switching process continues to switch the display area into the video signals after the channel selection, the screen update termination determination circuit 602 outputs a termination flag as a screen termination signal. According to this flag, the write area operation circuit 601 switches the write control circuit 510 for the normal frame write process, and switches the read control circuit 511 for the frame display.

Described above is the operation performed when channels are switched, and a signal output from the video memory 509 is phase-adjusted with the luminance and chrominance signals by the output processing unit 512. Then, the D/A converting circuit 513 converts the signal into analog data, and the display processing part 514 performs a matrix transformation on the color signal. Finally, the signal is displayed on the CRT display 515.

According to the embodiment shown in FIG. 10, the disturbance of the video signal generated in the channel selection period in the tuner 505 is not masked with a level such as 'all black', but the final image before channel selection is displayed as a still image. Then, the write area of a video signal of a channel after the channel selection, or of the signal after being switched into another input signal is gradually increased from top to base on the still image. Thus, a new image can be updated as if it were sliding down as a curtain. Furthermore, the write area of the video signal of a channel after the channel selection, or the signal after being switched into another input signal is gradually increased under the write control of the video memory 509 from base to top, from left to right, from right to left, or in a combination of vertical and horizontal directions (that is, diagonally from left top to right base) on the still image, thereby sliding and updating the new image.

In the video switching process, a complicated circuit is avoided by displaying images in the one-field display mode during the switching process. Additionally, the deterioration of the quality of an image can be reduced on the display by automatically switching screens such that a frame display can be realized according to a screen update termination flag, thereby smoothly switching a video signal.

Figure 12:
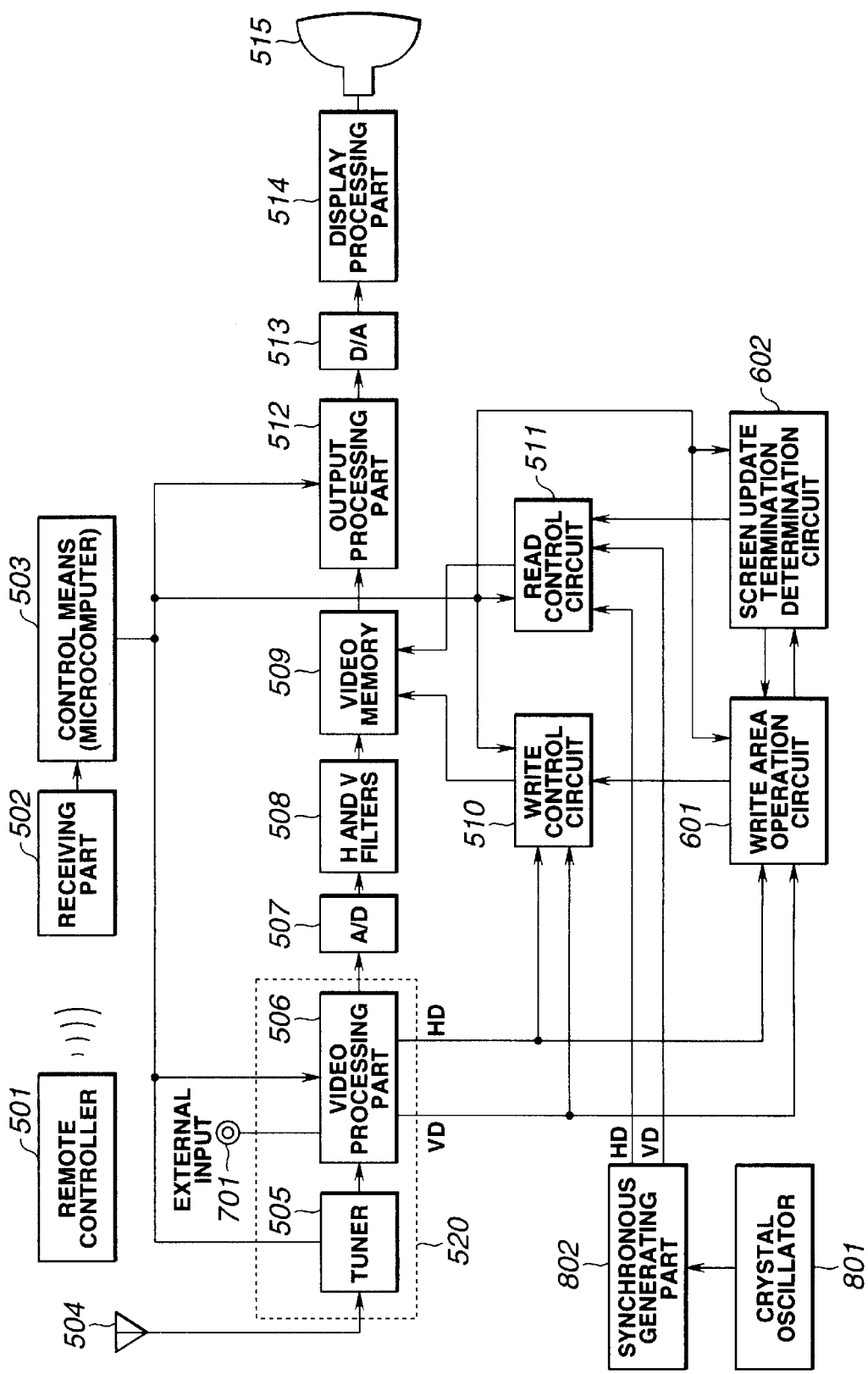
FIG. 12 is a block diagram showing a video switching processing apparatus according to the sixth embodiment of the present invention.

FIG. 12 is a block diagram showing a video switching processing apparatus according to the sixth embodiment of the present invention. Since the basic configuration of the embodiment is the same as that shown in FIG. 10, the detailed explanation about each block is omitted here.

FIG. 12 is different from FIG. 10 in that the synchronous signals HD and VD to be provided for the read control circuit 511 for reading a video signal from the video memory 509 is a stable synchronous signal other than a synchronous signal of a displayed image.

That is, a synchronous generating part 802 obtains a clock output from a crystal oscillator 801, and generates synchronous signals HD and VD as a second synchronous signal. These signals are provided for the read control circuit 511.

With the above described configuration, even if the video signal displayed on the screen is switched in channel selection or input switch of TV/VTR, etc. The video memory read control circuit 511 is constantly controlled by the second synchronous signal, thereby avoiding a display state in which a displayed image vertically trembles during the video switching process, and a stable image switching process can be performed.

Figure 13:
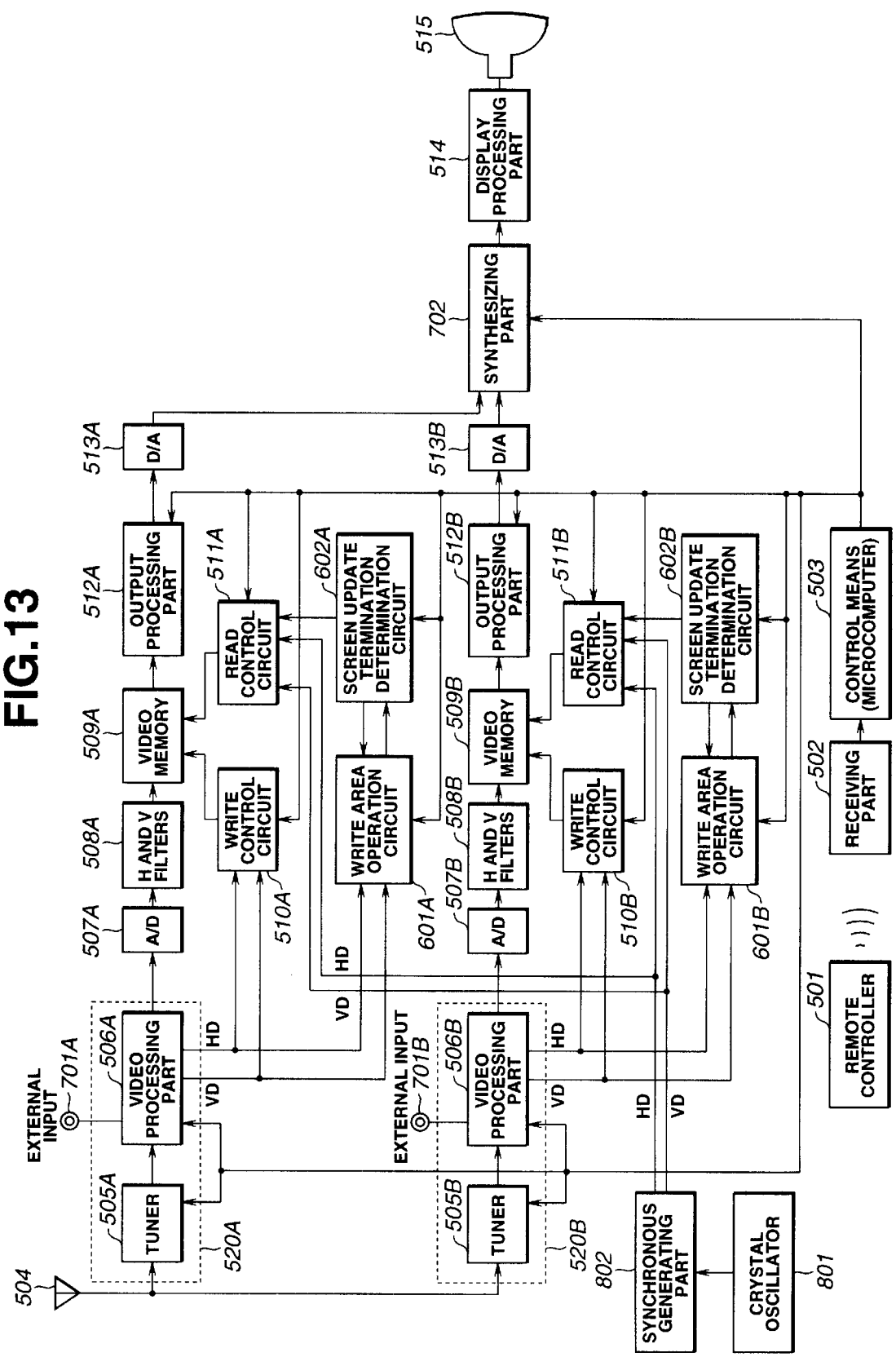
FIG. 13 is a block diagram showing a video switching processing apparatus according to the seventh embodiment of the present invention.

FIG. 13 is a block diagram showing the seventh embodiment of the present invention. The present embodiment relates to a video switching processing apparatus in a television receiver, and can realize a 2-screen arrangement display by dividing the screen of the CRT display 515 into a main screen and a sub-screen (so-called double window display mode). The basic configuration is the same as that of the circuit shown in FIG. 12.

That is, the configuration in the present embodiment is provided with a main screen circuit for forming a main screen and a sub-screen circuit for forming a sub-screen.

The main screen circuit comprises a first tuner 505A; a first video processing part 506A; a first video circuit 520A;

a first A/D converting circuit 507A; first H and V filters 508A; a first video memory 509A; a first output processing part 512A; a first D/A converting circuit 513A; a first write control circuit 510A; a first read control circuit 511A; a first write area operation circuit 601A; a first screen update termination determination circuit 602A; and a first external input terminal 701A of an external video signal.

The sub-screen circuit comprises a second tuner 505B; a second video processing part 506B; a second video circuit 520B; a second A/D converting circuit 507B; second H and V filters 508B; a second video memory 509B; a second output processing part 512B; a second D/A converting circuit 513B; a second write control circuit 510B; a second read control circuit 511B; a second write area operation circuit 601B; a second screen update termination determination circuit 602B; and a second external input terminal 701B of an external video signal.

The read control circuits 511A and 511B of the main screen circuit and the sub-screen circuit use a stable horizontal synchronous signal HD and a vertical synchronous signal VD from the synchronous generating part 802 based on the clock from the crystal oscillator 801 as read reference signals.

A main screen video signal and a sub-screen video signal from the first and second video circuits 520A and 520B are provided for the first and second video memory 509A and 509B. The signals are written according to the write address specified by the first and second write control circuits 510A and 510B. The main screen video data and the sub-screen video data are read from the first and second video memory 509A and 509B according to the read addresses specified by the first and second read control circuits 511A and 511B. At this time, the video data is read from the first and second video memory 509A and 509B according to the read reference signal. At the same time, at the specification of a display position from the control means 503 (in this example, specification such that two display images are almost the same in size, and adjacently arranged on the display screen), the video data of the main screen and the sub-screen is read at the display position timing of the main screen and the sub-screen set on the display screen. The video data of the main screen and the sub-screen read from the first and second video memory 509A and 509B are D/A converted, and then become analog main- and sub-screen video signals. Then, the synthesizing part 702 comprising switch means switches and synthesizes the main-screen video signal and the sub-screen video signal and outputs them as a main/sub-video signal. This signal is provided for the display processing part 514 at the next stage, and is processed in the essential display process into a display signal. Then, the signal is displayed on the CRT display 515, which is display means.

FIGS. 14(a) through (f) show the display state when images are switched in the apparatus shown in FIG. 13. In this example, the video switching on the sub-screen, for example, the sub-screen images in the double window display are channel-changed.

Figure 14A:
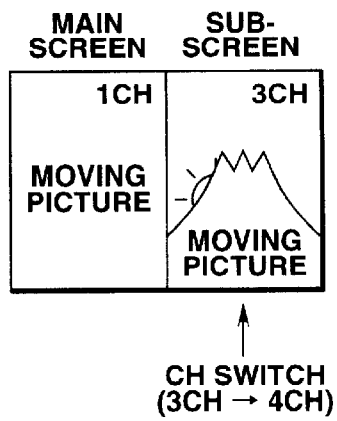
FIGS. 14(a) through (f) show the display state when images are switched as shown in FIG. 13.
Figure 14B:
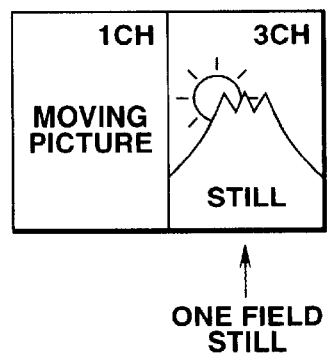
Figure 14C:
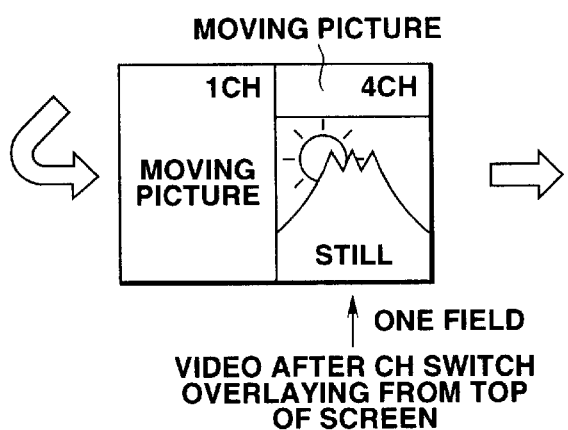
Figure 14D:
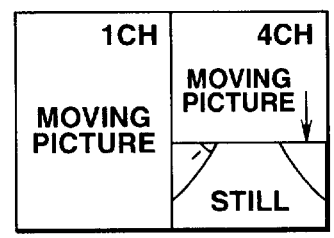
Figure 14E:
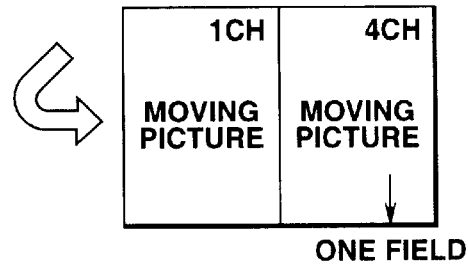
Figure 14F:
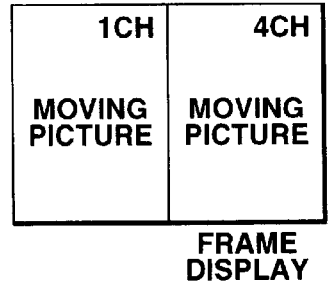

As shown in FIGS. 14(a) through (f), the current sub-screen images (for example, 3CH image) are set still (one-field display), and then the sub-screen channel is changes (from 3 CH to, for example, 4CH). The screen is updated with the number of overwrite lines increased for each field of a 4CH image over a 3CH still image. As shown in FIGS. 14(c) through (e), the image after the channel (CH) switch gradually covers the previous image from top to base of the screen. When the image is completely updated, the one-field display is switched to the frame display as shown in FIG. 14(f). With the configuration shown in FIG. 13, when the channel of the main screen image in the double window display is changed, images can be switched as on the sub-screen of FIGS. 14(a) through (f). Furthermore, images on the main screen and sub-screen can be simultaneously switched. Additionally, with the configuration shown in FIG. 13, as in the case shown in FIG. 12, in addition to the video signal for the main screen and the video signal for the sub-screen, the third synchronous signal, which has nothing to do with the display, from the synchronous generating part 802 is provided. The third synchronous signal other than the synchronous signal of the main screen/sub-screen is used as a synchronous signal supplied to the read control circuits 511A and 511B of the video memory 509A and 509B, thereby controlling operations using the constantly stable third synchronous signal even if a channel is re-selected or the input of TV/VTR, etc. is switched. As a result, a displayed image can be prevented from being trembling vertically, etc. when images are switched on the main screen/sub-screen, and a stable display can be realized.

As described above, according to the video switching processing apparatus according to the fifth through the seventh embodiment of the present invention, channels can be switched and input can be switched with the screen switched to a new image can be displayed, thereby realizing a video apparatus such as a television receiver for outputting smooth pictures.

The present invention is not limited to the above described embodiment, and can be applied in various embodiments within the concept of the invention.

What is claimed is:

1. a multi-screen display apparatus comprising:
    a first synchronous video processing means for synchronously video processing a video signal of a first input system;
    a second synchronous video processing means for synchronously video processing a video signal of a second input system;
    a first field determining means for determining whether a first video signal output from the first synchronous video processing means is a first field or an second field;
    a second field determining means for determining whether a second video signal output from the second synchronous video processing means is a first field or second field;
    a selection switching means for selecting and alternately outputting one of two sets of signals synchronously video-processed by the first and second synchronous video processing means;
    a write means for outputting the first video signal as a write video signal when the first video signal has been selected by said selection switching means and said first field determining means has determined that the first video signal output from said first synchronous video processing means is the first field, and outputting the second video signal as a write video signal when the second video signal has been selected by said selection switching means and said second field determining means has determined that the second video signal output from said second synchronous video processing means is the first field;
    a storing means for storing the first or second video signal alternately output from said write means; and
    a read means for reading the video signal written to the storing means according to a predetermined synchronous signal.

2. A multi-screen display apparatus comprising:
a first synchronous video processing means for synchronously video processing a video signal of a first input system;
a second synchronous video processing means for synchronously video processing a video signal of a second input system;
a first field determining means for determining whether the video signal output from the first synchronous video processing means is a first field or a second field;
a second field determining means for determining whether the second video signal output from the second synchronous video processing means is a first field or a second field;
a selection switching means for selecting and alternately outputting one of the two of signals output from said first and second synchronous video processing means;
a write means for outputting the first video signal as a write video signal when the first video signal has been selected by said selection switching means and said first field determining means has determined that the first video signal output from said first synchronous video processing means is the first field, and outputting the second video signal as a write video signal when the second video signal has been selected by said selection switching means and said second field determining means has determined that the second video signal output from said second synchronous video processing means is the first field;
a write interval variable means for controlling the first or second write means such that the first and second video signals can be respectively output at 2N-field intervals (N indicates a natural number) depending on a vertical synchronization phase relationship between the first and second video signal;
a storing means for storing the first or second video signal alternately output from said write means; and
a read means for reading the video signal written to the storing means according to a predetermined synchronous signal.

3. The multi-screen display apparatus of claim 2, wherein the write interval variable means controls the write means such that the first an second video signals can be written to the storing means at 2- or 4field intervals base on the vertical synchronous phase relationship between the first and second video signals.

4. A multi-screen display apparatus according to claim 2, further comprising:
means for properly changing the timing of select signals which alternately switches the first and second video signals in said selection switching means so as to enable the alternate outputting of the first or second video signal to said storing means in field units even if there is a change in the vertical synchronization phase relationship of the first and second video signals synchronously video-processed by said first and second synchronous video processing means.

5. A multi-screen display apparatus comprising:
a first synchronous video processing means for synchronously processing a video signal of a first input system;
a second synchronous video processing means for synchronously processing a video signal of a second input system;
a first field determining means for determining whether the video signal output from the first synchronous video processing means is an odd field or an even field;
a second field determining means for determining whether the video signal output from the second synchronous video processing means is an odd field or an even field;
a selection switching means for selecting one of two sets of signals synchronously processed by the first and second synchronous video processing means;
a storing means for storing the first or second video signal synchronously processed by the first or second synchronous video processing means and selected by the selection switching means;
a first write means for writing a video signal from the selection switching means to the storing means only when the first or second video signal output from the selection switching means is either an odd field or an even field based on the determination result from the first or second field determining means;
a second write means for independently generating a skip signal for optionally setting an address in the storing means and for writing the first or second video signal to the storing means by using the skip signal when writing the first or second video signal to the storing means;
a write interval variable means for controlling the first and second write means such that the first and second video signals can be written to a predetermined position in the storing means based on the value of the skip signal, and that the first and second video signals can be respectively written to the storing means at 2N field intervals (N indicates a natural number) depending on the vertical synchronization phase relationship between the first and second video signals; and
a read means for reading the video signal written to the storing means according to a predetermined synchronous signal.

6. A multi-screen display apparatus comprising:
M (M indicates a natural number) synchronous processing means for processing synchronous signals of video signals of M input systems;
M field determining means for determining whether each video signal is a first field or a second field based on said synchronous signals of video signals of M input systems;
selection switching means for sequentially switching and outputting M sets of signals in pairs of various signals synchronously processed by the M synchronous processing means and corresponding video signals;
a write means for outputting write enable signals corresponding to M video signals based on various signals in pairs of M video signals in said M sets of signals sequentially output by said selection switching means when said M field determining means have respectively determined that each video signal is the first field;
video processing means for video-processing M video signals in said M sets of signals sequentially output from the selection switching means;
storing means for storing said M video signals sequentially video processed by said video processing means using said write enable signals; and
read means for reading the video signal written to the storing means according to a predetermined synchronous signal.

7. A multi-screen display apparatus comprising:
a first selection switching means for selection-switching synchronous signals of video signals from M (M is a natural number) input systems, and for sequentially outputting the signals;

a synchronous processing means for synchronously processing the M signals sequentially output from the first selection switching means;

a second selection switching means for selection-switching video signals from M input systems, and for sequentially outputting the signals;

a video processing means for video-processing the M signals sequentially output from the second selection switching means;

a field determining means for determining whether each video signal is an odd field or an even field based on the synchronous signal output from the first selection switching means;

a storing means for storing a video signal video-processed by the video processing means;

a write means for writing the video signal to the storing means only when the M video signals sequentially output from the video processing means are either odd fields or even fields based on the determination result of the field determining means; and a read means for reading a video signal written to the storing means according to a predetermined synchronous signal.

8. A video switching processing apparatus for switch-processing video signals using video memory comprising:

a video circuit for switching and outputting an input video signal;

an A/D converting circuit for A/D converting the video signal from the video circuit;

an operating means for instructing a switch of a video signal to be provided from the video circuit to the A/D converting circuit;

a video memory for storing a digital video signal from the A/D converting circuit;

a write control circuit for generating a write control signal and writing the digital video signal to the video memory;

a control means for controlling switching a video signal in the video circuit by generating a video switch signal according to an instruction to switch the video signal from the operating means, and for controlling stopping a write to the video memory for a predetermined period after a video switch instruction by controlling the write control circuit according to the video switch signal;

a write area operation circuit for starting a write to every other field in the video memory by controlling the write control circuit after stopping the write in the predetermined period by the control means, determining the number n of lines or the number n (n is a fixed value) of picture elements increased in one writing operation, and setting a write area by performing an operation of n×m , that is multiplying n by the number m (m is a natural number) or writing operation to set a write area;

a screen update termination determination circuit form comparing the operation result of n×m from the write area operation circuit with a predetermined end-of-write position, generating a screen update termination signal for changing the write to the video memory into a frame write when the operation result n×m reaches the end-of-write position and thereby the video switching process is completed, and providing the signal for the write area operation circuit;

a read control circuit for generating a read control signal and reading a digital video signal from the video memory;

a means for setting a read of the video memory to a one-field read, in a term from the stop of a write by the control means to the completion of the video switching process by the screen update termination determination circuit, and for changing the one-field read into a frame read after the term.

9. A video switching processing apparatus according to claim 8 wherein, an image updated by the display means when images are switched from one of the top, base, left, and right end of the screen or in combination of the vertical and horizontal directions of the screen based on the setting by the write area operation circuit.

10. A video switching processing apparatus according to claim 8 wherein:

a reference signal of the read control circuit is a stable synchronous signal other than the synchronous signal based on the displayed video signal.

11. A video switching processing apparatus cable of displaying two images, that is a main image and a sub-image, arranged horizontally on the display screen and switch processing the two images respectively using video memory, comprising:

a first video circuit for switching and outputting an input video signal;

a second video circuit for switching and outputting an input video signal;

a first A/D converting circuit for A/D converting a video signal from the first video circuit;

a second A/D converting circuit for A/D converting a video signal from the second video circuit;

an operating means for instructing a switch of a video signal to be provided from the first and second video circuit to the first and second A/D converting circuit;

a first video memory for storing a digital video signal from the first A/D converting circuit;

a second video memory for storing a digital video signal from the second A/D converting circuit;

a first write control circuit for generating a write control signal and writing the digital video signal to the video memory;

a second write control circuit for generating a write control signal and writing the digital video signal to the second video memory;

a control means for controlling switching a video signal in the video in at least one of the first and second video circuits by generating a video switch signal according to an instruction to switch the video signal from the operating means, and for controlling stopping a write to at least one of the first and second video memory for a predetermined period after a video switch instruction by controlling at least one of the first and second write control circuits according to the video switch signal;

a first write area operation circuit for starting a write to every other field in the video memory by controlling the first write control circuit after stopping the write in the predetermined period by the control means, determining the number n of lines or the number n (n is a fixed value) of picture elements increased in one writing operation, and setting a write area by performing an operation of n×m, that is multiplying n by the number m (m is a natural number) or writing operation to set a write area;

a second write area operation circuit for starting a write to every other field in the video memory by controlling the first write control circuit after stopping the write in the predetermined period by the control means, determining the number n of lines or the number n (n is a fixed value) of picture elements increased in one writing operation, and setting a write area by performing an operation of n×m, that is multiplying n by the number m (m is a natural number) or writing operation to set a write area;

a first screen update termination determination circuit form comparing the operation result of n×m from the first write area operation circuit with a predetermined end-of-write position, generating a screen update termination signal for changing the write to the video memory into a frame write when the operation result n×m reaches the end-of-write position and thereby the video switching process is completed, and providing the signal for the first write area operation circuit;

a second screen update termination determination circuit form comparing the operation result of n×m from the second write area operation circuit with a predetermined end-of-write position, generating a screen update termination signal for changing the write to the video memory into a frame write when the operation result n×m reaches the end-of-write position and thereby the video switching process is completed, and providing the signal for the second write area operation circuit;

a first read control circuit for generating a read control signal and reading a digital video signal from the first video memory;

a second read control circuit for generating a read control signal and reading a digital video signal from the second video memory;

a means for setting a read of the first video memory to a one-field read, in a term from the stop of a write to the first video memory by the control means to the completion of the video switching process by the first screen update termination determination circuit, and for changing the one-field read into a frame read after the term;

a means for setting a read of the second video memory to a one-field read, in a term from the stop of a write to the second video memory by the control means to the completion of the video switching process by the second screen update termination determination circuit, and for changing the one-field read into a frame read after the term;

a first D/A converting circuit for D/A converting the output from the first video memory;

a second D/A converting circuit for D/A converting the output from the second video memory;

a synthesizing means for synthesizing an analog signal from the first D/A converting circuit with an analog video signal from the second D/A converting circuit; and a display means for displaying a display signal based on the synthesized video signal from the synthesizing means.

12. A video switching processing apparatus according to claim 11 wherein, one of the main image and the sub-image updated by the display means is switched from one of the top, base, left, and right end of one of the main screen and the sub-screen or in combination of the vertical and horizontal directions of one of the main screen and subscreen based on the setting by one of the first and the second write area operation circuits.

13. A video switching processing apparatus according to claim 11 wherein, the reference signals of the first and second read control circuits are stable synchronous signals other than the synchronous signal based on the displayed video signal.

* * * * *